US010749691B2

(12) United States Patent
Meyer et al.

(10) Patent No.: US 10,749,691 B2
(45) Date of Patent: *Aug. 18, 2020

(54) PROVIDING QUALITY OF SERVICE FOR CERTIFICATE MANAGEMENT SYSTEMS

(71) Applicant: INTEGRITY Security Services, Inc., Irvine, CA (US)

(72) Inventors: Alan T. Meyer, Anaheim Hills, CA (US); Daniel R. Fynaardt, Capistrano Beach, CA (US)

(73) Assignee: INTEGRITY SECURITY SERVICES LLC, Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/511,483

(22) Filed: Jul. 15, 2019

(65) Prior Publication Data
US 2020/0153641 A1   May 14, 2020

Related U.S. Application Data

(63) Continuation of application No. 16/189,895, filed on Nov. 13, 2018, now Pat. No. 10,439,825.

(51) Int. Cl.
| | |
|---|---|
| *H04L 29/06* | (2006.01) |
| *H04L 9/32* | (2006.01) |
| *H04L 9/08* | (2006.01) |
| *H04L 9/30* | (2006.01) |
| *H04W 12/04* | (2009.01) |

(52) U.S. Cl.
CPC .......... *H04L 9/3263* (2013.01); *H04L 9/088* (2013.01); *H04L 9/30* (2013.01); *H04W 12/04* (2013.01)

(58) Field of Classification Search
CPC ......... H04L 9/3263; H04L 9/30; H04L 9/088; H04W 12/04
See application file for complete search history.

(56) References Cited

U.S. PATENT DOCUMENTS

| | | | |
|---|---|---|---|
| 6,138,106 A * | 10/2000 | Walker .................. | G06Q 20/28 235/381 |
| 6,233,577 B1 * | 5/2001 | Ramasubramani ..... | H04L 29/06 |
| 6,792,536 B1 * | 9/2004 | Teppler ................... | G06F 21/64 713/178 |

(Continued)

OTHER PUBLICATIONS

Non-Final Office Action dated Feb. 14, 2019, U.S. Appl. No. 16/189,985, pp. 1-9.

(Continued)

*Primary Examiner* — David Garcia Cervetti
(74) *Attorney, Agent, or Firm* — MH2 Technology Law Group LLP

(57) ABSTRACT

An example system receives certificate requests from clients. Each request can indicate a number of computerized devices needing certificates; a timestamp indicating when the request was transmitted; and a client identifier. The system includes a Quality of Service (QoS) manager that: distributes the requests from the clients across client queues, each of the client queues corresponding to a particular client; and divides requests into smaller subgroups of entries corresponding to a subset of the computerized devices needing certificates. The system can also transmit retrieved entries from the client queues to a certificate management service.

30 Claims, 12 Drawing Sheets

(56) References Cited

U.S. PATENT DOCUMENTS

| | | | | |
|---|---|---|---|---|
| 6,934,838 B1* | 8/2005 | Boyce | H04L 63/0407 | 713/156 |
| 7,131,003 B2* | 10/2006 | Lord | H04L 63/0823 | 713/168 |
| 7,398,220 B1* | 7/2008 | Hayes | G06Q 40/08 | 705/4 |
| 7,426,635 B1* | 9/2008 | Parkhill | H04L 63/0823 | 705/50 |
| 7,631,183 B2* | 12/2009 | Brown | H04W 12/04033 | 713/157 |
| 7,814,161 B2* | 10/2010 | Brown | G06Q 10/107 | 709/206 |
| 8,195,934 B1* | 6/2012 | Lawrence | H04L 63/0823 | 713/156 |
| 9,143,490 B2* | 9/2015 | Larson | H04L 63/0272 | |
| 9,282,130 B1* | 3/2016 | Goepp | H04L 12/1818 | |
| 9,491,620 B2* | 11/2016 | Edge | H04L 63/0823 | |
| 9,544,153 B1* | 1/2017 | Roskind | H04L 9/3268 | |
| 9,553,730 B2* | 1/2017 | Saboor | H04L 63/0823 | |
| 10,055,260 B2* | 8/2018 | Teshler | H04L 67/10 | |
| 10,057,243 B1* | 8/2018 | Kumar | H04W 8/005 | |
| 10,439,826 B2* | 10/2019 | Grajek | H04L 9/3271 | |
| 2002/0103723 A1* | 8/2002 | Platner | G06Q 30/06 | 705/26.1 |
| 2002/0116609 A1* | 8/2002 | Yellepeddy | H04L 63/0442 | 713/156 |
| 2002/0120840 A1* | 8/2002 | Yellepeddy | H04L 63/0823 | 713/156 |
| 2002/0120841 A1* | 8/2002 | Yellepeddy | H04L 63/0823 | 713/156 |
| 2003/0014623 A1* | 1/2003 | Freed | H04L 29/06 | 713/150 |
| 2003/0014625 A1* | 1/2003 | Freed | H04L 63/0485 | 713/153 |
| 2003/0014628 A1* | 1/2003 | Freed | H04L 63/0281 | 713/155 |
| 2003/0014650 A1* | 1/2003 | Freed | H04L 29/06 | 713/189 |
| 2004/0054885 A1* | 3/2004 | Bartram | H04L 63/0823 | 713/152 |
| 2004/0133520 A1* | 7/2004 | Callas | G06Q 10/107 | 705/51 |
| 2004/0133774 A1* | 7/2004 | Callas | H04L 63/0428 | 713/153 |
| 2004/0133775 A1* | 7/2004 | Callas | H04L 63/0442 | 713/153 |
| 2004/0255113 A1* | 12/2004 | Ogura | H04L 63/062 | 713/156 |
| 2005/0069136 A1* | 3/2005 | Thornton | H04L 63/0823 | 380/277 |
| 2005/0198508 A1* | 9/2005 | Beck | H04L 51/12 | 713/170 |
| 2006/0036848 A1* | 2/2006 | Brown | H04L 63/0823 | 713/156 |
| 2006/0085306 A1* | 4/2006 | Schulte | G06Q 40/02 | 705/31 |
| 2006/0168107 A1* | 7/2006 | Balan | G06F 9/505 | 709/218 |
| 2006/0168446 A1* | 7/2006 | Ahonen | H04L 9/3263 | 713/163 |
| 2007/0067428 A1 | 3/2007 | Ogawa et al. | | |
| 2007/0073621 A1* | 3/2007 | Dulin | G06F 21/33 | 705/50 |
| 2007/0222555 A1* | 9/2007 | Tengler | H04L 9/3263 | 340/5.6 |
| 2007/0291791 A1* | 12/2007 | English | H04L 45/00 | 370/469 |
| 2008/0022103 A1* | 1/2008 | Brown | H04L 9/3226 | 713/175 |
| 2008/0069347 A1* | 3/2008 | Brown | H04L 9/3066 | 380/45 |
| 2008/0232583 A1* | 9/2008 | Di Crescenzo | H04L 9/002 | 380/44 |
| 2008/0232595 A1* | 9/2008 | Pietrowicz | G06Q 20/3829 | 380/277 |
| 2008/0250247 A1* | 10/2008 | Touzeau | H04L 9/3247 | 713/178 |
| 2009/0013177 A1* | 1/2009 | Lee | G06F 21/10 | 713/158 |
| 2009/0144541 A1* | 6/2009 | Kim | H04L 63/0869 | 713/156 |
| 2009/0260057 A1* | 10/2009 | Laberteaux | H04L 63/0823 | 726/2 |
| 2010/0025466 A1* | 2/2010 | Cardone | H04L 9/3268 | 235/386 |
| 2010/0191973 A1* | 7/2010 | Huntzicker | H04W 12/06 | 713/176 |
| 2010/0241852 A1* | 9/2010 | Sela | G06F 21/73 | 713/156 |
| 2011/0029771 A1* | 2/2011 | Mehta | H04L 63/0823 | 713/156 |
| 2011/0072260 A1* | 3/2011 | Koo | H04N 21/26613 | 713/156 |
| 2011/0083011 A1* | 4/2011 | DiCrescenzo | H04L 9/0891 | 713/158 |
| 2011/0119154 A1* | 5/2011 | Lombardi | G06Q 30/04 | 705/26.41 |
| 2001/1023186 | 9/2011 | Walsh | | |
| 2011/0231862 A1* | 9/2011 | Walsh | G06F 13/00 | 719/318 |
| 2012/0239935 A1 | 9/2012 | Osborne et al. | | |
| 2013/0036427 A1* | 2/2013 | Chen | G06F 9/546 | 719/312 |
| 2013/0077486 A1* | 3/2013 | Keith | H04L 47/2433 | 370/230.1 |
| 2013/0117286 A1* | 5/2013 | Gallant | G06F 7/24 | 707/752 |
| 2013/0322255 A1* | 12/2013 | Dillon | H04L 47/22 | 370/236 |
| 2014/0059694 A1* | 2/2014 | Lortz | G06F 21/60 | 726/26 |
| 2014/0281555 A1* | 9/2014 | Dixon | H04L 63/104 | 713/176 |
| 2014/0373118 A1* | 12/2014 | Doi | H04L 9/3268 | 726/6 |
| 2015/0222549 A1* | 8/2015 | Kakadia | H04L 47/18 | 370/231 |
| 2015/0222560 A1* | 8/2015 | Kakadia | H04L 47/50 | 370/235 |
| 2016/0006837 A1* | 1/2016 | Reynolds | H04W 84/18 | 709/203 |
| 2016/0234690 A1* | 8/2016 | Michalski | H04W 48/10 | |
| 2016/0291885 A1* | 10/2016 | Pendharkar | G06F 13/4027 | |
| 2016/0294779 A1* | 10/2016 | Yeakley | H04L 63/126 | |
| 2016/0315777 A1* | 10/2016 | Lloyd | H04L 9/3265 | |
| 2017/0006135 A1* | 1/2017 | Siebel | G06F 8/10 | |
| 2017/0134172 A1* | 5/2017 | Scriber | H04L 9/3263 | |
| 2017/0222990 A1* | 8/2017 | Romansky | H04L 9/14 | |
| 2017/0288881 A1* | 10/2017 | Marko | H04W 12/08 | |
| 2017/0324566 A1* | 11/2017 | Kawasaki | H04L 9/3268 | |
| 2017/0366359 A1* | 12/2017 | Scarlata | H04L 9/0816 | |
| 2018/0004452 A1* | 1/2018 | Ganguli | H04L 43/0817 | |
| 2018/0006829 A1* | 1/2018 | Kravitz | H04L 9/3255 | |
| 2018/0062855 A1* | 3/2018 | Bracken | H04L 9/14 | |
| 2018/0069708 A1* | 3/2018 | Thakore | H04L 9/006 | |
| 2018/0159693 A1* | 6/2018 | Condeixa | H04W 4/38 | |
| 2018/0176209 A1* | 6/2018 | Narayanan | H04L 63/0823 | |
| 2018/0189103 A1 | 7/2018 | Teshler et al. | | |
| 2018/0322274 A1* | 11/2018 | Lutz | H04L 63/0823 | |
| 2018/0323977 A1* | 11/2018 | Hojsik | H04L 63/061 | |
| 2019/0014055 A1* | 1/2019 | Gupta | H04L 47/50 | |
| 2019/0036788 A1* | 1/2019 | Gupta | H04L 43/0882 | |
| 2019/0074980 A1* | 3/2019 | Loreskar | H04L 9/006 | |
| 2019/0149342 A1* | 5/2019 | Fynaardt | H04L 41/0806 | 713/156 |
| 2019/0166494 A1* | 5/2019 | Poplawsky | H04L 63/0823 | |

(56) References Cited

U.S. PATENT DOCUMENTS

2019/0182236 A1* 6/2019 Rangaraj ............. H04L 63/0442
2019/0260762 A1* 8/2019 Fynaardt ............... H04W 4/029

OTHER PUBLICATIONS

Notice of Allowance dated Jun. 7, 2019, U.S. Appl. No. 16/189,985, pp. 1-13.
Dahai Li et al., "An Online Self-Optimizing QoS Control Framework in Middleware", Information Science and Applications (ICISA), 2010 International Convenference on IEEE, Apr. 21, 2010, pp. 1-8.
European Search Report dated Apr. 3, 2020, EP Application No. 19208976, 9 pages.

* cited by examiner

PROVIDING QUALITY OF SERVICE FOR CERTIFICATE MANAGEMENT SYSTEMS

CROSS REFERENCE TO RELATED APPLICATIONS

This application is a continuation of U.S. patent application Ser. No. 16/189,895, filed Nov. 13, 2018, which is hereby incorporated by reference in its entirety.

FIELD OF THE INVENTION

This invention relates to systems, devices, and methods for securely generating and providing certain types of digital assets such as security credentials and digital certificates. More particularly, the invention relates to improved systems, methods and techniques for providing Quality of Service (QoS) levels while securely provisioning digital assets in computerized devices in order to reduce or eliminate delays in provisioning the digital assets in the computerized devices.

BACKGROUND

As computers have become ever more miniaturized and commoditized, manufacturers are producing more and more varied devices that include one or more embedded computer or processor. The computer in a computerized device can control the device's operation; collect, store, and share data; communicate with other computers and other computerized devices; and update its own software, among other things.

The Internet of Things (IoT) is the network of computerized physical devices that have embedded processor(s), electronics, software, data, sensors, actuators, and/or network connectivity, which enable these devices to connect and exchange data via digital networks, including the Internet, cellular networks, and other wireless networks. Typically, each "thing" is uniquely identifiable through its embedded computing system, and is able to inter-operate within the existing Internet infrastructure.

"Things", in the IoT sense, can refer to a wide variety of computerized devices, such as consumer appliances, enterprise devices used in business and corporate settings, manufacturing machines, farming equipment, energy-consuming devices in homes and buildings (switches, power outlets, appliances, lighting systems, bulbs, televisions, garage door openers, sprinkler systems, security systems, etc.), medical and healthcare devices, infrastructure management devices, robots, drones, and transportation devices and vehicles, among many others.

For example, most, if not all, modern vehicles and transportation machinery (e.g., automobiles, trucks, aircraft, trains, watercraft, motorcycles, scooters, and the like) contain several embedded processors or embedded computers in their subsystems, and are computer-controlled in at least some aspects. Similarly, a growing number of modern transportation infrastructure devices (e.g., traffic lights, traffic cameras, traffic sensors, bridge monitors, bridge control systems, and the like) contain at least one, and often many, embedded processors or embedded computer systems, and are computer-controlled in at least some aspects. These computer-controlled elements of the transportation network typically communicate with each other, passing various types of information back and forth, and they may react, respond, change their operation, or otherwise depend upon the information received/sent from/to other vehicles in Vehicle-to-Vehicle (V2V; also known as Car-to-Car (C2C)) communications and/or from/to infrastructure elements in Vehicle-to-Infrastructure (V2I; also known as Car-to-Infrastructure (C2I)) communications for safe, correct, efficient, and reliable operation.

The computers in computerized devices operate according to their software and/or firmware and data. In order to ensure safe and proper operation, the computerized devices must be properly initialized and updated with the proper software, firmware, executable instructions, digital certificates (e.g., public key certificates), cryptographic keys and the like (hereinafter collectively referred to as "digital assets" or "software") as intended by the manufacturer, so that the IoT consists only of devices that are executing authorized, known-to-be-good software and data. Problems arise, however, when unauthorized persons or organizations (e.g., hackers) replace or change the software in computerized devices. Problems also arise when older software, untested software, unapproved software, and/or software with known bugs is installed in computerized devices.

In the fields of computer networking, packet-switched networks, and telecommunications, Quality of Service (QoS) refers to a set of technology and techniques designed to provide improved service to selected users, customers, client devices, or network traffic. The goal of QoS is to provide guarantees on the performance of a service or network. QoS metrics can include delay, availability, latency, bandwidth, upload data transfer rate, download data transfer rate, and per-session upload/download limits (i.e., total amount of megabytes or gigabytes that can be uploaded and/or downloaded during a network session). A service or a network can assign different QoS levels to different users and client devices. QoS can also guarantee a certain level of performance to a user or client device in accordance with requests from an application program. QoS guarantees are important when computing capacity or network capacity is limited, or when requests to be fulfilled are delay sensitive.

Accordingly, it is desirable to provide improved systems, methods and techniques for providing QoS levels while securely provisioning digital assets in computerized devices, such as IoT devices, vehicles, and transportation infrastructure devices, in order to reduce or eliminate delays in provisioning the digital assets in the computerized devices.

SUMMARY

Disclosed herein are systems, methods and devices for providing QoS levels while fulfilling requests to generate certain types of digital assets such as security credentials and digital certificates. In various implementations, the systems, methods, and devices use a QoS manager to provide QoS levels to clients requesting certificates from a certificate management system (CMS). In some implementations, the CMS hosts a certificate management service that accepts requests from the QoS manager to create and provide certain types of digital assets such as security credentials and public key certificates. The QoS manager uses a QoS arbiter to populate and manage a QoS queue so that the CMS can appropriately manage separate and distinct requests based on their specific QoS level. In various implementations, the certificate management service is able to create certificates for Vehicle-to-Vehicle and Vehicle-to-Infrastructure (V2X) devices, as well as Car-to-Car and Car-to-Infrastructure (C2X) devices. In various implementations, a system includes a QoS manager that provides QoS levels to clients submitting certificate requests. The QoS manager is communicatively connected to a certificate management service that generates certificates such as enrollment certificates and pseudonym certificates in response to receiving requests for such certificates from the QoS manager.

As additionally described herein, a QoS manager enables a certificate management service to provide multi-tenant (e.g., multi-client) operations by providing QoS levels by managing intermediary client queues corresponding to tenants and using a QoS arbiter to select a sequence of entries from the client queues to be placed on a QoS queue. For example, customized workflows can be created and customized configurations can be managed by end entities via an entity management system.

In various implementations, a system provides quality of service (QoS) levels to multiple clients (e.g., tenants or customers) requesting certificates from a certificate management service. The system includes an application programming interface (API) operable to receive certificate requests from a plurality of clients, where each certificate request indicates a number of computerized devices needing certificates, a timestamp indicating when the certificate request was transmitted, and a particular client requesting the certificates. The system also includes a QoS manager that is operable to distribute the certificate requests from the plurality of clients across a plurality of intermediary client queues. Each of the plurality of client queues corresponds to a particular client requesting certificates. The QoS manager is also operable to divide a certificate request from a client in a client queue into subgroups (i.e., smaller groups) of one or more entries, each of the one or more entries having a group size corresponding to a subset of the number of computerized devices needing certificates. The QoS manager can also transmit retrieved entries from the plurality of client queues to the certificate management service.

In some embodiments, the system further includes a QoS arbiter that is operable to select a sequence of entries from the plurality of client queues to be placed onto a QoS queue. The QoS arbiter can select the sequence of entries from the client queues based at least in part on a number of entries in the QoS queue, a latency level of the certificate management service, and respective timestamps indicating when the certificate requests were transmitted. The QoS manager is further operable to transmit the retrieved entries from the plurality of client queues to the certificate management service by obtaining the retrieved entries from the QoS queue in the sequence selected by the QoS arbiter.

In certain implementations, the computerized devices correspond to one or more of an On Board Unit (OBU), an Electronic Control Unit (ECU), and a Road-Side Unit (RSU), where an OBU is configured to be installed in one or more of a vehicle, a watercraft (e.g., a boat), an aircraft, a spacecraft, a medical device, a robot, a drone, a wireless or wired communication module, and an IoT device, an ECU is configured to be installed in one or more of a vehicle, a watercraft, an aircraft, a spacecraft, a medical device, a robot, a drone, a wireless communication module, a wired communication module, and an IoT device, and an RSU is configured to be installed in one or more of a traffic control device, a wireless communication module, a digital billboard, and an electronic sign.

In certain implementations, the plurality of clients includes at least one distributor appliance acting as a proxy between the certificate management service and at least one computerized device needing certificates. The distributor appliance can be located at a manufacturer's site, such as, for example, a factory. According to such implementations, the at least one computerized device can retrieve certificates from the distributor appliance after the distributor appliance receives the certificates from the certificate management service. In additional implementations, the plurality of clients includes at least one server acting as a proxy between the certificate management service and at least one computerized device needing certificates. In accordance with such implementations, the at least one computerized device can retrieve certificates from the server after the server receives them from the certificate management service.

According to some implementations, each certificate request further indicates a client priority level of a client submitting the request, and wherein the QoS arbiter is further operable to select the sequence of entries from the plurality of client queues to be placed onto the QoS queue based at least in part on a respective client priority level indicated in a certificate request. In accordance with some such implementations, the QoS arbiter is further operable to dynamically re-order the sequence of entries placed onto the QoS queue based at least in part on respective client priority levels indicated in additional certificate requests received from additional clients. In some such implementations, a client priority level for a client is based on a service tier associated with the client. According to some such implementations, a service tier corresponds to one of a plurality of tiers ranging from a lowest service level to a to highest service level. In some such implementations, a service tier is an alphanumeric string or numerical value corresponding to one of the plurality of tiers.

In other implementations, each certificate request further indicates a request urgency level associated with the request, and the QoS arbiter is operable to select the sequence of entries from the plurality of client queues to be placed onto the QoS queue based at least in part on a respective request urgency level indicated in a certificate request. According to some such implementations, a request urgency level for a certificate request is designated by a client submitting the certificate request. In accordance to certain such implementations, a request urgency level corresponds to one of a plurality of levels ranging from a lowest urgency option to a highest urgency option. In some such implementations, a request urgency level is an alphanumeric string or numerical value corresponding to one of the plurality of levels.

In yet other implementations, the QoS arbiter is operable to select the sequence of entries from the plurality of client queues to be placed onto the QoS queue using a round robin technique.

In still other implementations, the QoS arbiter is operable to select the sequence of entries from the plurality of client queues to be placed onto the QoS queue based on a dynamic priority assigned to each of the client queues, and wherein the respective, dynamic priority assigned to each of the client queues is assigned by the QoS arbiter based at least in part on a number of entries in each of the client queues.

In additional implementations, the API is operable to receive, via a communications network, certificate requests from the plurality of clients, the certificate requests including requests for enrollment certificates; and transmit, on behalf of the certificate management service, via the communications network, to the plurality of clients, enrollment certificates generated by an enrollment certificate authority of the certificate management service. According to some such implementations, the certificate requests further include requests for pseudonym certificates, and the API is further operable to transmit, on behalf of the certificate management service, via the communications network, to the plurality of clients, pseudonym certificates generated by a pseudonym certificate authority of the certificate management service. In some examples, the plurality of clients can include at least one distributor appliance that is operable to act as a proxy between the certificate management service and at least one computerized device needing certificates. Additionally, the at least one computerized device can be operable to retrieve certificates from the distributor appliance.

In accordance with some such implementations, an enrollment certificate is a public key certificate identifying a holder of the public key certificate as an authorized participant in an ecosystem including a plurality of computerized devices, and wherein each authorized participant in the ecosystem is able to receive one or more pseudonym certificates that enable communications with the plurality of computerized devices.

In certain implementations, a computer implemented method provides quality of service (QoS) levels to clients requesting certificates from a certificate management service. The computer implemented method includes receiving, via an application programming interface (API), certificate requests from a plurality of clients. Each certificate request indicates a number of computerized devices needing certificates. The method further includes distributing, by a QoS manager, the certificate requests from the plurality of clients across a plurality of intermediary client queues, each of the plurality of client queues corresponding to a particular client requesting certificates. The method also includes dividing, by the QoS manager, a client's requests into subgroups (i.e., smaller groups) of one or more entries, each of the one or more entries corresponding to a subset of the number of computerized devices needing certificates. The method can additionally include transmitting retrieved entries from the plurality of client queues to the certificate management service.

The method can additionally include selecting, by a QoS arbiter, the retrieved entries from the plurality of client queues based at least in part on a latency level of the certificate management service, or respective timestamps indicating when the certificate requests were transmitted. In some examples, selecting the retrieved entries from the plurality of client queues can include using a round robin technique. The method can also include selecting the retrieved entries from the plurality of client queues based on a dynamic priority assigned to each of the client queues, wherein the respective, dynamic priority assigned to each of the client queues is assigned by the QoS arbiter based at least in part on a number of entries in each of the client queues.

BRIEF DESCRIPTION OF THE DRAWINGS

The accompanying drawings, which are incorporated into and constitute a part of this specification, illustrate implementations of the invention and together with the description, serve to explain the principles of the invention. In the figures.

DETAILED DESCRIPTION

Figure 1A:
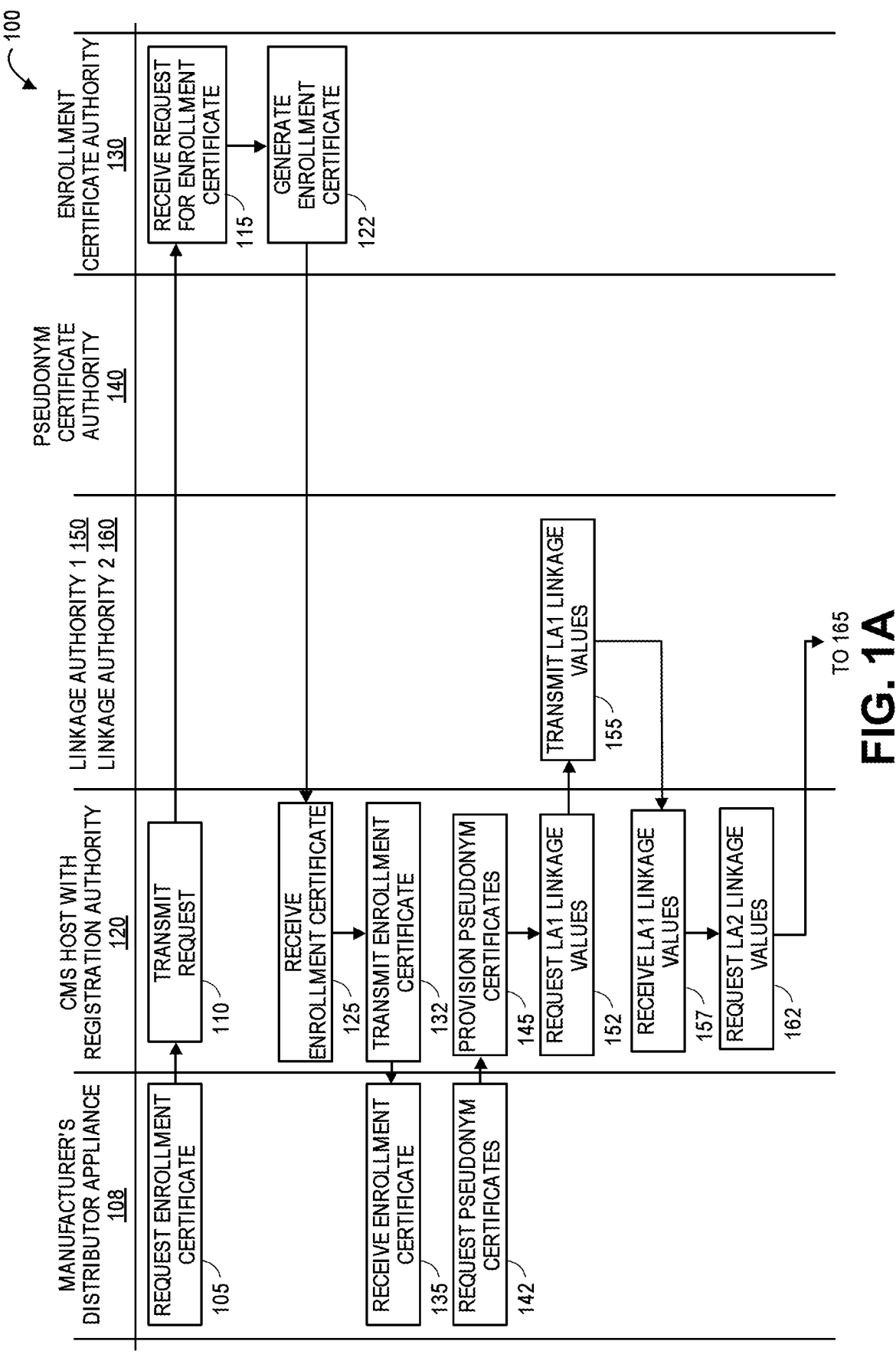
FIG. 1A is the first part of a swim-lane diagram illustrating an example of a process for securely providing credentials such as certificates, consistent with implementations of the invention.

Reference will now be made in detail to various implementations of the invention, examples of which are illustrated in the accompanying drawings. Wherever convenient, the same reference numbers will be used throughout the drawings to refer to the same or like parts.

In order to ensure safe and proper operation in the field, embedded devices, for instance, the Electronic Control Units (ECUs) used in vehicles, need to be properly initialized during manufacturing by provisioning digital assets, such as security assets. Digital assets could include various digital certificates, cryptographic keys, a unique identifier, and software. In most cases, a CMS or a certificate management service that generates these digital assets and manufacturing factories are located in different geographical locations, which are conventionally interconnected via insecure Internet communications. It is therefore desirable to create an end-to-end secure channel from the origin of these digital assets to the device, such that the digital assets cannot be accessed or modified by malicious parties or by accident. Typically, different manufacturing factories and tenants (e.g., customers and clients) require different numbers of digital assets (e.g., different-sized bundles of digital certificates). Therefore, it is also desirable to minimize delays in providing these digital assets due to computing capacity bottlenecks or communications bandwidth limitations associated with large requests.

There are drawbacks to traditional certificate management systems (CMSs) and certificate management services, in that they issue certificates on a first-come, first-served basis. This creates a technical problem in that when a large request is made by a customer and received, requests coming to the certificate management system or service after the large request must wait for that large request to be completed. Traditional techniques for minimizing delays or bottlenecks associated with waiting for large certificate requests to be fulfilled include having independent certificate management services with dedicated equipment for each customer. Issues with this traditional approach are that allocating dedicated equipment is expensive, inefficient, and contrary to providing a multi-customer solution in that equipment dedicated to a given customer may be idle while other equipment dedicated to another customer is at maximum capacity. Systems, methods and devices consistent with the present disclosure address these and other problems of conventional certificate management systems and services. Example solutions address these problems by employing a method for fairness that allows multiple customers (e.g., clients) to submit overlapping or concurrent certificate requests without starving any one client.

Provisioning generally refers to the set of actions taken to prepare a computerized device with appropriate data and software. It may also include the set of actions taken to properly install the device in its operational environment, making it ready for operation. The actions include loading the appropriate digital assets (e.g., operating system, device drivers, middleware, applications, digital certificates, and the like) into a digital storage (e.g., memory) of the device, and appropriately customizing and configuring certain digital assets on the device (if needed), which digital assets may be unique to each particular device. The actions may also include verifying that the computerized device is a legitimate device created by a legitimate device manufacturer, and not a copy or a counterfeit device.

The actions may also include correctly installing the device into its operational environment and testing it to verify that it is operating properly. The ability to securely provision only known-to-be-good devices is complicated by the fact that the devices may be built by one manufacturer and later installed by another into a larger system or device—for example an On Board Unit (OBU) built by a component manufacturer may be installed into a car built by the car manufacturer. An improperly installed device may function incorrectly.

Various implementations consistent with the present invention provide QoS levels for fulfilling certificate requests as part of a workflow for secure provisioning of computerized devices, including IoT devices. Such implementations serve to prevent large certificate requests from some clients creating bottlenecks or undue delays at the expense of smaller requests from other clients.

Various implementations consistent with the present invention may also use a QoS manager with a QoS arbiter to break apart large certificate requests into smaller, more manageable pieces that are placed onto a QoS queue in order to efficiently fulfill certificate requests as part of a secure provisioning and management platform, which may be provided as a service to device and system manufacturers.

Figure 1B:
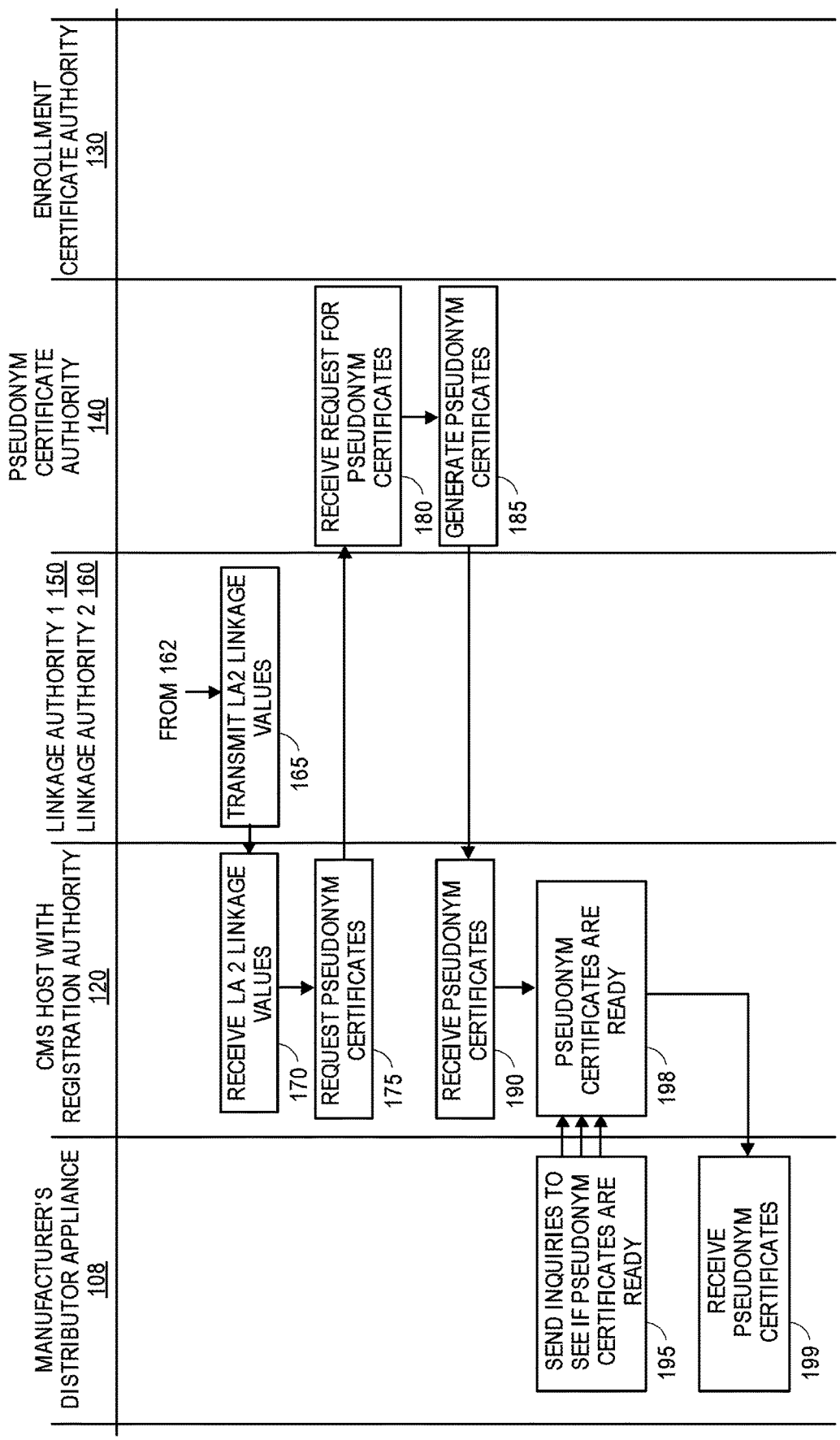
FIG. 1B is the second part of a swim-lane diagram illustrating an example of a process for securely providing credentials such as certificates, consistent with implementations of the invention.

FIGS. 1A and 1B are together a swim-lane diagram illustrating an example process 100 for securely providing credentials such as certificates, consistent with implementations of the invention. In particular, the example process 100 illustrated in FIGS. 1A and 1B includes exchanges of requests and responses between CMS components in order to provide certificates to V2X devices. However, implementations described herein are not limited to V2X devices, and the disclosed principles can be applied to other types of computerized devices and computer-controlled devices, such as C2X devices. That is, the CMS may host a certificate management service that functions as a V2X or C2X certificate management service. The example process 100 depicted in FIGS. 1A and 1B provides certificates to V2X devices. FIGS. 1A and 1B depict components of an example CMS in the context of the V2X flow of requests and responses.

In various implementations, some or all of the process 100 or the operations shown may be performed by code executing on a computing system (which may include one or more processors or one or more computing subsystems), by a hardware-only system, or by a system that is a hybrid of the two. As shown across the top of FIGS. 1A and 1B, the entities involved with the process 100 include a distributor appliance 108 that is located at a manufacturer (not shown), a registration authority 120 of a CMS host (e.g., a CMS that hosts a certificate management service), linkage authorities 150, 160, a pseudonym certificate authority 140, and an enrollment certificate authority 130. In various implementations, these entities may communicate with each other to carry out tasks as part of the process 100 for providing certificates, as described below with respect to FIGS. 1A and 1B and throughout this disclosure.

In certain implementations, the CMS host may be a system that hosts a certificate management service. The CMS communicates with the QoS manager. In some implementations, such communication is via calls to an internal application programming interface (API) of the certificate management service.

The CMS includes the registration authority 120, one or more linkage authorities 150, 160, the pseudonym certificate authority 140, and the enrollment certificate authority 130. An example CMS may include one or more application platforms that run an application for the registration authority 120. These application platforms are communicatively connected to one or more compute engines that perform cryptographic computations required by the registration authority 120. The one or more application platforms may include one or more virtual machines (VMs) or one or more hardware platforms (e.g., servers, computers, or other computer hardware capable of hosting and executing a software application). The CMS may also include one or more VMs that run the enrollment certificate authority 130 and that are communicatively connected to one or more compute engines that perform cryptographic computations required by the enrollment certificate authority 130. The enrollment certificate authority 130 is operable to generate and conditionally transmit enrollment certificates to the registration authority 120. The example CMS host that hosts the registration authority 120 of FIGS. 1A and 1B may further include one or more VMs that run an application for the pseudonym certificate authority 140 and that are communicatively connected to one or more compute engines that perform cryptographic computations required by the pseudonym certificate authority 140. The pseudonym certificate authority 140 is operable to generate and conditionally transmit pseudonym certificates to the registration authority 120. The CMS host may also include one or more VMs that run first and second linkage authorities 150, 160 and that are communicatively connected to one or more compute engines that perform cryptographic computations required by the first and second linkage authorities 150, 160. Respective applications for the first linkage authority 150 and the second linkage authority 160 may be operable to generate and conditionally transmit linkage values to the registration authority 120.

The CMS host that hosts the registration authority 120 shown in FIGS. 1A and 1B can also include one or more application platforms that run an application for the registration authority 120 and that are communicatively connected to one or more compute engines that perform cryptographic computations required by the registration authority 120. The CMS host can additionally include one or more application platforms that run an application for the enrollment certificate authority 130 and that are communicatively connected to one or more compute engines that perform cryptographic computations required by the enrollment certificate authority 130, which may be operable to generate and conditionally transmit enrollment certificates to the registration authority 120. The CMS host can further include one or more application platforms that run an application for the pseudonym certificate authority 140 and that are communicatively connected to one or more compute engines that perform cryptographic computations required by the pseudonym certificate authority 140, which may be operable to generate and conditionally transmit pseudonym certificates to the registration authority 120. In addition, the CMS host can include one or more application platforms that run an application for the first linkage authority 150 and that are communicatively connected to one or more compute engines that perform cryptographic computations required by the first linkage authority 150. Lastly, the CMS host can also include one or more application platforms that run an application for the second linkage authority 160 and that are communicatively connected to one or more compute engines that perform cryptographic computations required by the second linkage authority 160. The linkage authorities 150, 160 may be operable to generate and conditionally transmit linkage values to the registration authority 120.

In still other implementations, the enrollment certificate authority 130 may be operable to generate enrollment certificates in response to receiving requests for enrollment certificates from the registration authority 120; the pseudonym certificate authority 140 may be operable to generate pseudonym certificates in response to receiving requests for pseudonym certificates from the registration authority 120; and the first linkage authority 150 and the second linkage authority 160 may be operable to generate linkage values in response to receiving requests for linkage values from the registration authority 120. In alternative or additional implementations, the enrollment certificate authority 130 may be operable to generate enrollment certificates in response to receiving requests directly from computerized devices. That is, there are multiple ways to get enrollment certificates and the example process 100 shown in FIGS. 1A and 1B is just one example method.

As shown in the example of FIG. 1A, the process 100 begins with enrollment-related operations 105-135. A primary role of the enrollment certificate authority 130 is to fulfill requests from the registration authority 120 to issue enrollment certificates to end-user devices, such as, for example, the distributor appliance 108. As described below with reference to the example enrollment-related operations 105-135 shown in FIG. 1A, the enrollment certificate authority 130 may interact directly with the registration authority 120 in order to issue a requested enrollment certificate to distributor appliance 108. In additional or alternative implementations, the enrollment certificate authority 130 can communicate directly with the distributor appliance 108 that is operable to act as a proxy between the CMS hosting a certificate management service and computerized devices needing enrollment certificates, with the computerized devices needing enrollment certificates, and with servers that act as proxies for clients that request enrollment certificates. For example, the enrollment certificate authority 130 can communicate directly with a distributor appliance 108 that is located at a manufacturer site (e.g., the manufacturer's factory).

At 105, the distributor appliance 108 of a manufacturer requests an enrollment certificate from the registration authority 120, where the enrollment certificate will be provisioned to (e.g., used by) a computerized device and where the request may identify the computerized device that is the destination of the enrollment certificate. The request may be, for example, the distributor appliance 108 of a manufacturer that is requesting an enrollment certificate for a new computerized device (e.g., a new product). An enrollment certificate is a public key certificate that identifies its holder as an authorized participant in an ecosystem in which all participants must share valid enrollment certificates, (such as, for example, the U.S. Department of Transportation (USDOT) V2X ecosystem), and in which authorized participants are able to also receive pseudonym certificates that enable communication and operation of a device within the ecosystem (e.g., to enable communications and operations between vehicles and roadside infrastructure in the example of the USDOT's V2X ecosystem).

At 110, the request for the enrollment certificate is received at the registration authority 120, and then transmitted from the registration authority 120 to the enrollment certificate authority 130. In various implementations, this operation may involve the registration authority 120 decrypting and verifying the request, including signature verification, checking for revocation status of the device that is the destination of the enrollment certificate (e.g., a computerized device) using a list of unapproved devices (e.g., a blacklist), and determining whether the requestor (e.g., distributor appliance 108) is allowed to request enrollment certificates from the registration authority 120. For instance, operation 110 may include determining whether a user from a manufacturer is an authorized user (e.g., part of a staff). In some implementations, the registration authority 120 may also determine at 110 whether a computerized device (e.g., a product) to receive the enrollment certificate is approved for use. In some instances, a list of approved devices (e.g., a whitelist) may be provided by a regulator and used by a provisioning controller to make this determination. After the request for the enrollment certificate is verified, the request is transmitted from the registration authority 120 to the enrollment certificate authority 130. This request may be sent as an enrollment certificate generation request that is created by the registration authority 120.

At 115, the request for the enrollment certificate is received at the enrollment certificate authority 130. In response to receiving the request, at 120, the enrollment certificate authority 130 generates the requested enrollment certificate and transmits the generated enrollment certificate back to the registration authority 120. At 125, the enrollment certificate is received at the registration authority 120, and at 130, the registration authority 120 transmits the enrollment certificate to the distributor appliance 108. At 135, the distributor appliance 108 receives the enrollment certificate. At this point, the distributor appliance 108 may provision the enrollment certificate to a device so that the device can use the enrollment certificate, and the enrollment-related operations are completed.

Operations 140-199 are related to provisioning pseudonym certificates. In some implementations, operations 140-199 for requesting, generating, and provisioning pseudonym certificates include using a QoS manager (not shown in FIGS. 1A and 1B, but see QoS managers 801 and 901 of FIGS. 8 and 9) to provide QoS levels to multiple clients that request pseudonym certificates. At 140, the distributor appliance 108 requests pseudonym certificates from the registration authority 120. The pseudonym certificates will be provisioned to (e.g., used by) a computerized device and the request may identify the computerized device that is the destination for the pseudonym certificates. The request may be, for example, the distributor appliance 108 of a manufacturer that is requesting pseudonym certificates for a computerized device that previously received an enrollment certificate (e.g., an enrolled computerized device). Requests for pseudonym certificates can include client requests for a certain amount (e.g., a week's worth, a month's worth, or a year's worth) of public key certificates.

At 145, the request for the pseudonym certificates is received at the registration authority 120, which then initiates provisioning of the pseudonym certificates.

At operations 152-170, the linkage authorities 150, 160 interact directly with the registration authority 120 in order to fulfill requests for linkage values. At 150, the registration authority 120 transmits a request for a first set of linkage values (LA1) to linkage authority 1 150.

At 155, in response to receiving the request for a first set of linkage values, the linkage authority 1 150 generates and/or transmits the first set of linkage values to the registration authority 120. That is, the linkage authority 1 150 can transmit the first set of linkage values that have been previously generated (i.e., pre-generated linkage values), or the linkage authority 1 150 can generate and then transmit the first set of linkage values in cases where the values are not pre-generated. At 157, the first set of linkage values are received at the registration authority 120. At 160, the registration authority 120 transmits a request for a second set of linkage values (LA2) to linkage authority 2 160.

Next, as shown in FIG. 1B, at 165, in response to receiving the request for a second set of linkage values, the linkage authority 2 160 generates and/or transmits the second set of linkage values to the registration authority 120. In various implementations, the linkage authority 2 160 can transmit the second set of pre-generated linkage values, or alternatively, the linkage authority 2 160 can generate and transmit the second set of linkage values. At 170, the second set of linkage values are received at the registration authority 120.

In certain implementations, the linkage authorities 150, 160 shown in FIGS. 1A and 1B can link the identity of the certificate requestor (i.e., a unique identifier of the certificate requestor's device), to an issued pseudonym certificate for revocation purposes. That is, the linkage authority 1 150 and linkage authority 2 160 respectively provide the first and second set linkage values as unique identifiers of the certificate requestor's device to a pseudonym certificate issued by the pseudonym certificate authority 140 as part of process 100. The linkage authority 1 150 and linkage authority 2 160 receive requests for linkage values sent from the registration authority 120 at operations 152 and 162, and then provide the requested linkage values to the registration authority 120 at operations 155 and 165.

With continued reference to FIG. 1B, at 175, the registration authority 120 transmits a request for the pseudonym certificates to the pseudonym certificate authority 140. This request may be sent as a batch of pseudonym certificate generation requests that are created by the registration authority 120.

At 180, the request for the pseudonym certificates is received at the pseudonym certificate authority 140. In response to receiving the request, at 185, the pseudonym certificate authority 140 generates the requested pseudonym certificates and transmits the generated pseudonym certificates back to the registration authority 120. At 190, the pseudonym certificates are received at the registration authority 120.

At 195, the distributor appliance 108 may send multiple requests to the registration authority 120 to inquire as to whether the requested pseudonym certificates are ready (i.e., generated and available) or not. In certain implementations, the inquiries of operation 195 may be sent any time after the request for pseudonym certificate is sent at operation 142. For example, after sending the request for pseudonym certificates to the registration authority 120 at operation 142, the distributor appliance 108 may then periodically send inquiries to the registration authority 120 to determine if the requested pseudonym certificates are read. In this example, one or more of the inquiries of operation 195 may be sent in parallel with operations 145-190 (i.e., while the pseudonym certificates are being generated).

At 198, when the pseudonym certificates are ready, the registration authority 120 transmits the pseudonym certificates to the distributor appliance 108. At 199, the distributor appliance 108 receives the pseudonym certificates. At this point, the distributor appliance 108 may provision the pseudonym certificates to a device so that the device can use the pseudonym certificates, and the operations for provisioning the pseudonym certificates are completed.

In additional or alternative implementations, processes similar to the process 100 described above can be used to provide certificates to other computerized devices, such as, for example, C2X devices. For instance, a CMS with components similar to those shown in FIGS. 1A and 1B can provide certificates to one or more On Board Unit (OBUs), Electronic Control Unit (ECUs), or a Road-Side Units (RSUs). Such OBUs and ECUs can be configured to be installed into vehicles, watercraft (e.g., boats), aircraft (e.g., airplanes and drones), spacecraft, medical devices, robots, wireless or wired communication modules, and IoT devices. Similarly, the RSUs can be installed into traffic control devices (e.g., traffic signals), electronic signage devices, and digital display devices (e.g., electronic billboards).

It is to be understood that the QoS manager, QoS arbiter, and QoS queue described herein with regard to FIGS. 2-9 may be used to provide QoS levels to clients requesting certificates in a V2X context as well as a C2X context.

Figure 2:
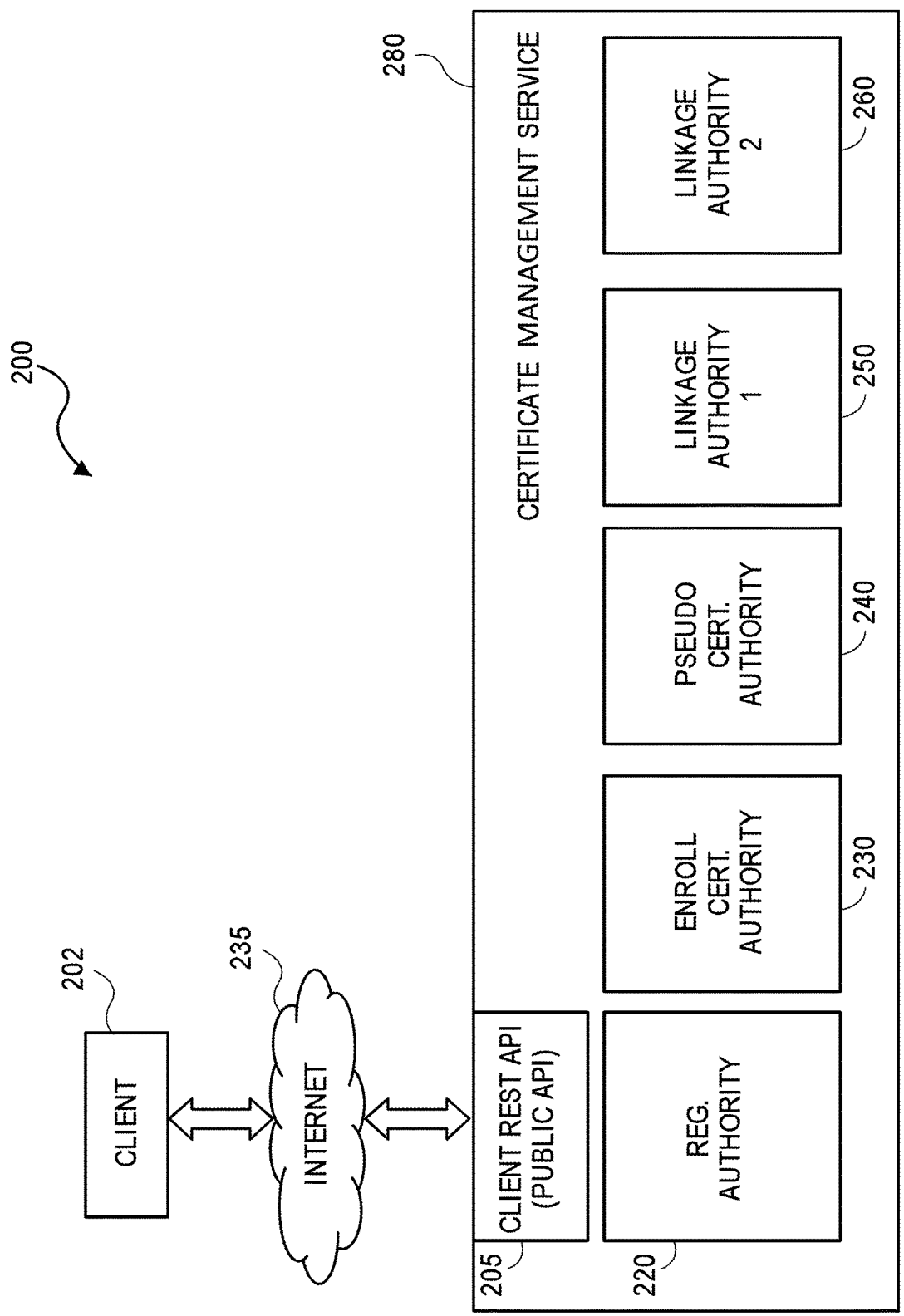
FIG. 2 is a block diagram of an example operating environment for a certificate management service and a single client, consistent with implementations of the invention.

FIG. 2 depicts an example operating environment 200 where a single client 202 interacts with a certificate management service 280. In some implementations, the certificate management service 280 may be a V2X certificate management service. In additional or alternative implementations, the certificate management service 280 may be a C2X certificate management service. As shown, the client 202 can submit a request for certificates for one or more computerized devices via a network 235. In the example of FIG. 2, the network 235 is the Internet. In certain implementations, the computerized devices correspond to one or more of a vehicle, a watercraft (e.g., a boat), an aircraft, a spacecraft, a medical device, a robot, a drone, a wireless or wired communication module, and an IoT device. For example, the computerized devices can correspond to an OBU or an ECU of a vehicle, a watercraft, an aircraft, a spacecraft, a robot, a drone, a medical device, or an IoT device. Also, for example, the computerized devices can correspond to an RSU of a traffic control device (e.g., a traffic signal, a traffic light, or electronic traffic signage), a digital billboard, or an electronic sign.

In the operating environment 200, the request for certificates is received by a client representational state transfer (REST) API 205 of a certificate management service 280. As shown in FIG. 2, the client REST API 205 can be a public API, and the certificate management service 280 can be a V2X or C2X certificate management service. The certificate management service 280 accepts the request for certificates, completes the task within a timeframe, and then returns the results (e.g., the generated certificates) to the client 202 via the network 235. In some implementations, the timeframe can be a number of minutes, hours, or days, depending on the processing capacity of the certificate management service 280.

The certificate management service 280 includes components for generating the requested certificates. In the example of FIG. 2, these components include a registration authority 220, an enrollment certificate authority 230, a pseudonym certificate authority 240, a linkage authority 1 250, and a linkage authority 2 260.

In additional or alternative implementations, the components of the certificate management service 280 may vary depending on whether the certificate management service 280 is configured as a V2X or C2X certificate management service. For example, in cases where the certificate management service 280 functions as a C2X certificate management service, the certificate management service 280 can include a Long Term Certificate Authority (LTCA) configured to fulfill a role similar to that of the enrollment certificate authority 230. Similarly, when the certificate management service 280 is embodied as a C2X certificate management service, the certificate management service 280 can include an Authorization Authority (AA) that fulfills a role similar to that of the pseudonym certificate authority 240. The components of the certificate management service 280 are described in the following paragraphs.

In an example, the certificate management service 280 can be embodied as a CMS. Various implementations of the certificate management service 280 may be used for extremely high volume device transaction and certificate generation processing. In various implementations, the certificate management service 280 may be implemented using multiple servers, multiple hardware security modules (HSMs), multiple compute or computing engines, and multiple application platforms. In an example implementation, the application platforms may each include one or more virtual machines (VMs) for hosting the registration authority 220, the enrollment certificate authority 230, the pseudonym certificate authority 240, and the linkage authorities 250 and 260. In additional or alternative implementations, the application platforms may each include one or more hardware platforms, such as, for example, application servers, computers, or other computer hardware capable of hosting and executing a software application. In the example of FIG. 2, the application platform for the enrollment certificate authority 230 may be one or more VMs that run an application for the enrollment certificate authority 130, the application platform for a pseudonym certificate authority 240 may be one or more VMs operable to host and run an application for the pseudonym certificate authority 240. Similarly, the application platform for a linkage authority 1 250 may be one or more VMs configured to host and run a linkage authority 1 application, and the application platform for a linkage authority 2 260 may be one or more VMs operable to host and run a linkage authority 2 application. Non-limiting examples of the certificate management service 280 may be implemented in a private data center, a cloud data center such as, for instance, Amazon web services (AWS) from Amazon, or in a hybrid of private and cloud data centers.

In some implementations, the certificate management service 280 may provide security certificates such as, for example, enrollment certificates and pseudonym certificates, to be used by the distributor appliance 108 of a manufacturer, which may function as described with respect to FIGS. 1A and 1B. In certain implementations, the certificate management service 280 may interact with a digital asset management system (DAMS) in order to provide certificates to the distributor appliance 108 shown in FIGS. 1A and 1B.

As illustrated in FIG. 2, the architecture of the certificate management service 280 includes a registration authority 220, the enrollment certificate authority 230, the pseudonym certificate authority 240, the linkage authority 1 250, and the linkage authority 2 260. Each of these components may utilize respective, dedicated compute engines (not shown) to perform tasks. For example, the registration authority 220 can utilize a registration authority compute engine, the enrollment certificate authority 230 can utilize an enrollment certificate authority compute engine, the pseudonym certificate authority 240 can utilize a pseudonym certificate authority compute engine, the linkage authority 1 250 can utilize a linkage authority 1 compute engine, and the linkage authority 2 260 can utilize linkage authority 2 compute engine. The functionalities of each of these components are described in the following paragraphs.

The architecture of the certificate management service 280 advantageously separates the non-security-related applications from the security functions. As shown in the example of FIG. 2, the registration authority 220, the enrollment certificate authority 230, the pseudonym certificate authority 240, and the linkage authorities 250, 260 are implemented as applications on their own VMs, which execute on their own dedicated compute engines, all of which are separate from any non-security-related applications and functions. This provides both a technical and security advantage and improvement over conventional systems, in which the performance of the HSMs is slow or in which the cloud service provider cannot supply HSMs or in which their proper management of the HSMs is uncertain. In the certificate management service 280, all cryptographic operations that require an HSM are performed in a compute engine (e.g., one or more of compute engines).

By separating the critical security functions from each other and onto separate compute engines, as shown in FIG. 2, the computation-intensive crypto and security functions (e.g., an elliptic curve butterfly expansion computation or an elliptic curve digital signature), for instance, as performed by the registration authority 220, the enrollment certificate authority 230, the pseudonym certificate authority 240, and the linkage authorities 250, 260, are performed significantly faster than existing registration authority systems. This design, in conjunction with the Quality of Service (QoS) manager described below with reference to FIGS. 8-10, enables significant improvements in transaction processing in a multi-client environment by enabling the "bottleneck" applications to be individually scaled as needed. As such, implementations consistent with the present disclosure provide a particular, technically advantageous system architecture to reduce bottlenecks associated with existing registration authority systems. For instance, if a registration authority application running on registration authority 220 needs to scale, additional VMs can be added while no change may be required in the secure compute capability of the registration authority compute engine(s). Alternatively, if the security computations are limiting performance, additional secure registration authority compute engines can be added. This same multi-dimensional scaling is true for the other components of the certificate management service 280. These capabilities provides significant performance improvements and scalability over existing Security Credential Management Systems (SCMS).

In some implementations, the respective application platforms for the registration authority 220, the enrollment certificate authority 230, the pseudonym certificate authority 240, and the linkage authorities 250, 260 are communicatively connected to compute engines via respective sets of input message queues so that these components of the certificate management service 280 can all scale independently from each other.

As noted above and shown in the non-limiting example of FIG. 2, each of the registration authority 220, the certificate authorities 230, 240, and the linkage authorities 250, 260 may be implemented as applications on their own virtual machines (VMs). In additional or alternative implementations, one or more of the registration authority 220, the certificate authorities 230, 240, and the linkage authorities 250, 260 may execute on hardware platforms (e.g., servers or compute engines). The roles and functionalities of each of these applications executing on application platforms (e.g., VMs or hardware platforms) are described in the following paragraphs.

In various implementations, the registration authority 220 may be the authority in a provisioning network that verifies user requests for a digital certificate, or other type of digital security asset, and enable a certificate authority, (e.g., the enrollment certificate authority 230 and the pseudonym certificate authority 240) to issue the digital certificate. In various implementations, the registration authority 220 may be similar to the registration authorities known in the public key infrastructure (PKI) system. In various implementations, the client REST API 205 may pass certificate requests to the registration authority 220, which can be implemented as a representational state transfer (REST) web service. In various implementations, there may be multiple instances of the registration authority 220 executing at the same time. This is similarly represented for the other components of the certificate management service 280 shown in FIG. 2. The registration authority functionality of the certificate management service 280 is non-centralized in that its functionality can be carried out by multiple instances of the registration authority 220 implemented as a REST web service. A primary role for the registration authority 220 is to grant and fulfill certificate provisioning requests while keeping the signing pseudonym certificate authority 240 from knowing which certificates end up in a particular computerized device. The registration authority 220 interact directly with the pseudonym certificate authority 240, the linkage authorities 250, 260 via message queues in order to fulfill their roles within the certificate management service 280.

In certain implementations, the registration authority 220 (and the other components of FIG. 2) may be connected to a database. The certificate management service 280 may utilize a collection of data stores or databases for data storage and retrieval. For example, the database used may consist of one or more database logical or physical units, each with one or more tables enabling data separation where required. As used herein, the term "database" refers to one or more databases or data stores. In certain implementations, the use of multiple databases can allow for data separation between the registration authority 220 other components of FIG. 2. For example, such use of multiple databases allows for data separation between the registration authority 220, the certificate authorities 230, 240, and the linkage authorities 250, 260.

In preferred implementations, the database(s) used by the certificate management service 280 is a collection of one or more fast access, low-latency databases. In some implementations, the database(s) may be a NoSQL database or database service, such as, for example, the DynamoDB data service offered by Amazon web services. In various implementations, the data stored in the database is application dependent, but may include past issued certificates, various linkage authority values, data on devices to whom certificates have been issued, operator actions, etc. Note that the data may be stored either unencrypted, encrypted, or some combination thereof.

In various implementations, the certificate management service 280 includes an enrollment certificate authority 230 and a pseudonym certificate authority 240, as the digital certificates produced by the registration authority 220 are split into different segments—e.g., an enrollment digital certificate and pseudonym digital certificates.

The enrollment certificate authority 230 is a non-central component of the certificate management service 280 as there may be multiple instances of the enrollment certificate authority 230 executing at the same time. For instance, in some implementations, there may be may be multiple instances of the enrollment certificate authority 230 executing simultaneously. The enrollment certificate authority 230 may receive requests for enrollment certificates from the registration authority 220. A primary role of the enrollment certificate authority 230 is to fulfill requests from the registration authority 220 to issue enrollment certificates to end-user devices, such as, for example, the distributor appliance 108 shown in FIGS. 1A and 1B. As described above with reference to FIG. 1A, an enrollment certificate authority 130 interacts directly with the registration authority 120 in order to fulfill its role within the CMS.

The pseudonym certificate authority 240 is a non-central component of the CMS in that there may be multiple instances of the pseudonym certificate authority 240 executing simultaneously. For the pseudonym certificate authority 240, in various implementations, there may be multiple instances of the pseudonym certificate authority 240 executing in parallel at the same time. The pseudonym certificate authority 240 may receive requests for pseudonym certificates from the registration authority 220. A primary role of the pseudonym certificate authority 240 is to fulfill requests from the registration authority 220 to issue pseudonym certificates to end-user devices, such as, for example, the distributor appliance 108 shown in FIGS. 1A and 1B. In certain implementations, the pseudonym certificate authority 240 fulfills requests for short-term pseudonym certificates for V2V functionality. As described below with reference to FIG. 5B, the pseudonym certificate authority 240 interacts directly with the registration authority 220 in order to fulfill its functions within the CMS.

In various implementations, the linkage authorities 250, 260 shown in FIG. 2 link the identity of the certificate requestor (i.e., a unique identifier of the certificate requestor's device), to an issued pseudonym certificate for revocation purposes. That is, the linkage authority 1 250 and linkage authority 2 260 provide respective linkage values as unique identifiers of the certificate requestor's device to the issued pseudonym certificate. The linkage authority 1 250 and linkage authority 2 260 may receive requests for linkage values from the registration authority 220, and then provide the requested linkage values to the registration authority 220. The linkage authorities 250, 260 interact directly with the registration authority 220 in order to fulfill requests for linkage values.

In various implementations, the compute engines include HSMs, which allow these components to perform secure computations without being unduly threatened from hackers. In some implementations, the compute engines may be designed to perform secure computations themselves without requiring an embedded HSM—in such implementations, they embody the HSM.

In various implementations, different HSM versions may be used in the CMS. For example, the HSMs may include embedded HSMs installed as plug-in cards within one or more of the compute engines. In such example implementations, the embedded HSMs may be installed in one or more of the compute engines as Peripheral Component Interconnect (PCI) HSMs or PCI Express (PCIe) HSMs. Also, for instance, the HSMs in the certificate management service 280 may include external, network-attached or network-connected HSMs that are separate from compute engines in their own enclosures.

One of ordinary skill will recognize that the components and implementation details shown in FIG. 2 are examples presented for conciseness and clarity of explanation. Other components, processes, implementation details, and variations may be used without departing from the principles of the invention, as this example is not intended to be limiting and many variations are possible.

Figure 3:
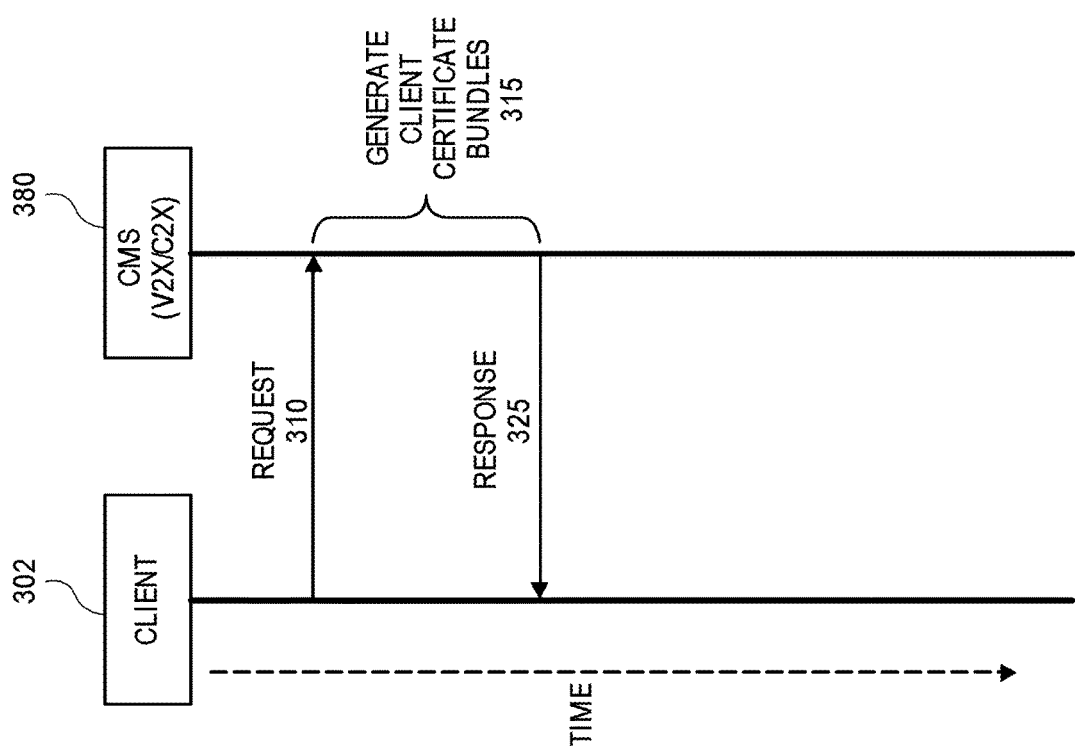
FIG. 3 is a data flow diagram illustrating example data flows between a single client and a CMS, consistent with implementations of the invention.

FIG. 3 is a data flow diagram illustrating example data flows between a single client 302 and a CMS 380, consistent with implementations of the invention. In the example of FIG. 3, the CMS 380 can be embodied as a V2X or C2X CMS. According to some implementations, the CMS 380 can host a certificate management service, such as the certificate management service 280 described above with reference to FIG. 2.

As shown in FIG. 3, the client 302 transmits a request 310 for certificates for one or more computerized devices. In some implementations, the computerized devices may be ECUs or OBUs that are configured to be installed in vehicles. In additional or alternative implementations, the computerized devices may be RSUs that are configured to be installed in traffic control devices (e.g., traffic lights, electronic traffic signage), digital billboards, and other roadside electronic signage. In certain implementations, each certificate request 310 indicates a number of computerized devices needing certificates, a timestamp indicating when the certificate request 310 was transmitted; and the client requesting the certificates (e.g., an identifier for the client 302 in the example of FIG. 3). In certain implementations, the identifier for the client (i.e., client identifier) can include or be one or more of a unique alpha-numeric string, an authentication token, and a client credential, such as, for example, a TLS certificate, or other type of digital certificate.

The CMS 380 accepts the request 310, and completes the requested task by generating the requested certificate bundles within a compute time 315. The certificate bundles are created by the CMS 380 within the compute time 315, which is a timeframe (e.g., a number of minutes, hours, or days). The compute time 315 can vary depending on various factors, such as the workload of the CMS 380, the number of computerized devices needing certificates (as indicated in the request 310), and a latency level of the CMS 380. After generating the certificate bundles (i.e., after the compute time 315 has elapsed), the CMS 380 then returns the results as a response 325 that is transmitted back to the client 302.

Figure 4:
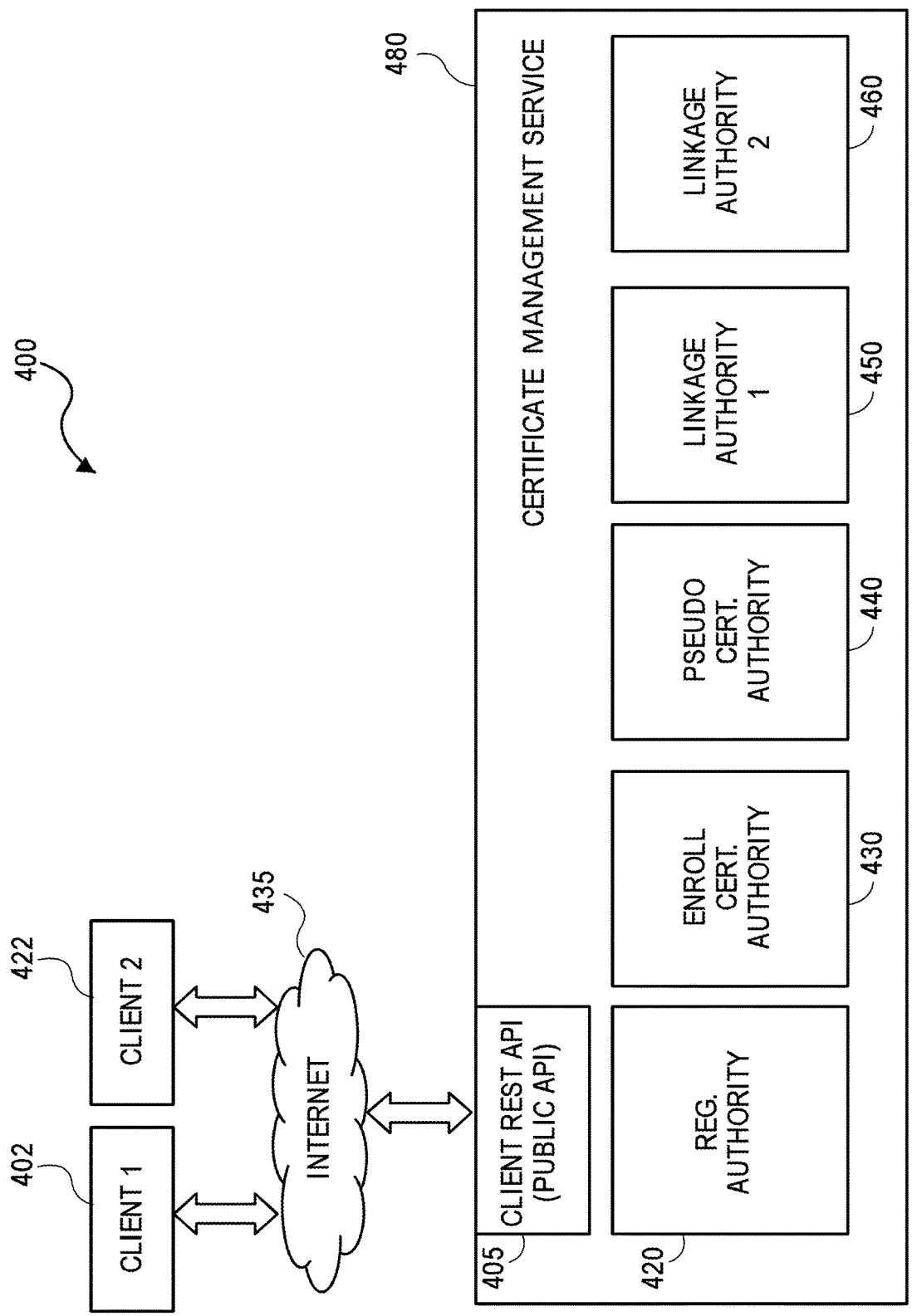
FIG. 4 is a block diagram of an example certificate management service operating in a two-client environment, consistent with implementations of the invention.

FIG. 4 is a block diagram of an example operating environment 400. In particular, FIG. 4 depicts a certificate management service 480 operating in a two-client environment, consistent with implementations of the invention. For brevity, only the differences occurring within FIG. 4, as compared to FIG. 2, are described below.

In FIG. 4, the example operating environment 400 includes two clients 402, 422 (e.g., client 1 and client 2) that can interact concurrently with the certificate management service 480. As shown, client 402 and client 422 can both submit respective, concurrent requests for certificates for one or more computerized devices via a network 435. In the example of FIG. 4, the network 435 is the Internet. In some implementations, the computerized devices correspond to one or more of a vehicle, a watercraft, an aircraft, a spacecraft, a medical device, a robot, a drone, a wireless or wired communication module, and an IoT device (e.g., an IoT appliance, an IoT sensor, an IoT switch, an IoT controller, or a wearable IoT device). For example, the computerized devices can correspond to an OBU or an ECU of a vehicle, a watercraft, an aircraft, a spacecraft, a robot, a drone, a medical device, or an IoT device. Further, for example, the computerized devices can correspond to an RSU of a traffic control device (e.g., a traffic signal, a traffic light, or electronic traffic signage), a digital billboard, or an electronic sign.

In the operating environment 400, the requests for certificates are received by a client REST API 405 of the certificate management service 480. As depicted in FIG. 4, the client REST API 405 can be a public API, and the certificate management service 480 can be a V2X or C2X certificate management service. The certificate management service 480 accepts the requests for certificates, completes the task within a timeframe, and then returns the results (e.g., the generated certificates) to clients 402, 422 via the network 435. The certificate management service 480 includes components for generating the requested certificates. In the example of FIG. 4, these components include a registration authority 420, an enrollment certificate authority 430, a pseudonym certificate authority 440, a linkage authority 1 450, and a linkage authority 4 460.

In additional or alternative implementations, the components of the certificate management service 480 may vary depending on whether the certificate management service 480 is configured as a V2X or C2X certificate management service. For example, as described above with reference to FIG. 2, in implementations where the certificate management service 480 functions as a C2X certificate management service, the certificate management service 480 can include a Long Term Certificate Authority (LTCA) configured to fulfill a role similar to that of the enrollment certificate authority 430. Similarly, when the certificate management service 480 is embodied as a C2X certificate management service, the certificate management service 480 can include an Authorization Authority that fulfills a role similar to that of the pseudonym certificate authority 440.

In the operating environment 400, there are two concurrent clients 402, 422 that can both request work from the same certificate management service 480. In an example, client 402 (e.g., client 1) can transmit, via the network 435, a request for a large number of computerized devices (e.g., >100,000 vehicles) and client 422 (e.g., client 2), subsequent to client 1's certificate request, can transmit a request for certificates for a relatively small number of computerized devices (e.g., <50 vehicles). For a simple certificate management service (either V2X or C2X) without a QoS manager, these two requests will be handled in order, on a first-come, first-served basis. In this example, client 422 (e.g., client 2) must wait for client 1's job to be completed before any response is provided. That is, even though client 2's request is relatively small, the time delay may be hours or days (i.e., however long it takes for the large request from client 402 to be fulfilled) instead of mere minutes that it would otherwise take to fulfill client 2's request.

Advantageously, implementations disclosed herein employ a QoS manager (see, e.g., the QoS managers 801 and 901 of FIGS. 8 and 9) than enable a certificate management service to provide QoS levels to multiple clients so that clients such as client 422 do not experience inordinate delays associated with waiting for earlier, large requests to be fulfilled. For instance, as described herein with reference to FIGS. 8-10, a QoS manager can be used by the certificate management service 480 to distribute certificate requests from clients 402, 422 across two corresponding intermediary client queues, each of the two client queues corresponding to a particular client (e.g., client 402 or client 422) requesting certificates. The QoS manager can also divide a client's requests into smaller groups (i.e., subgroups) of one or more entries where each entry corresponds to a subset of the number of computerized devices that client needs certificates for.

Figure 5:
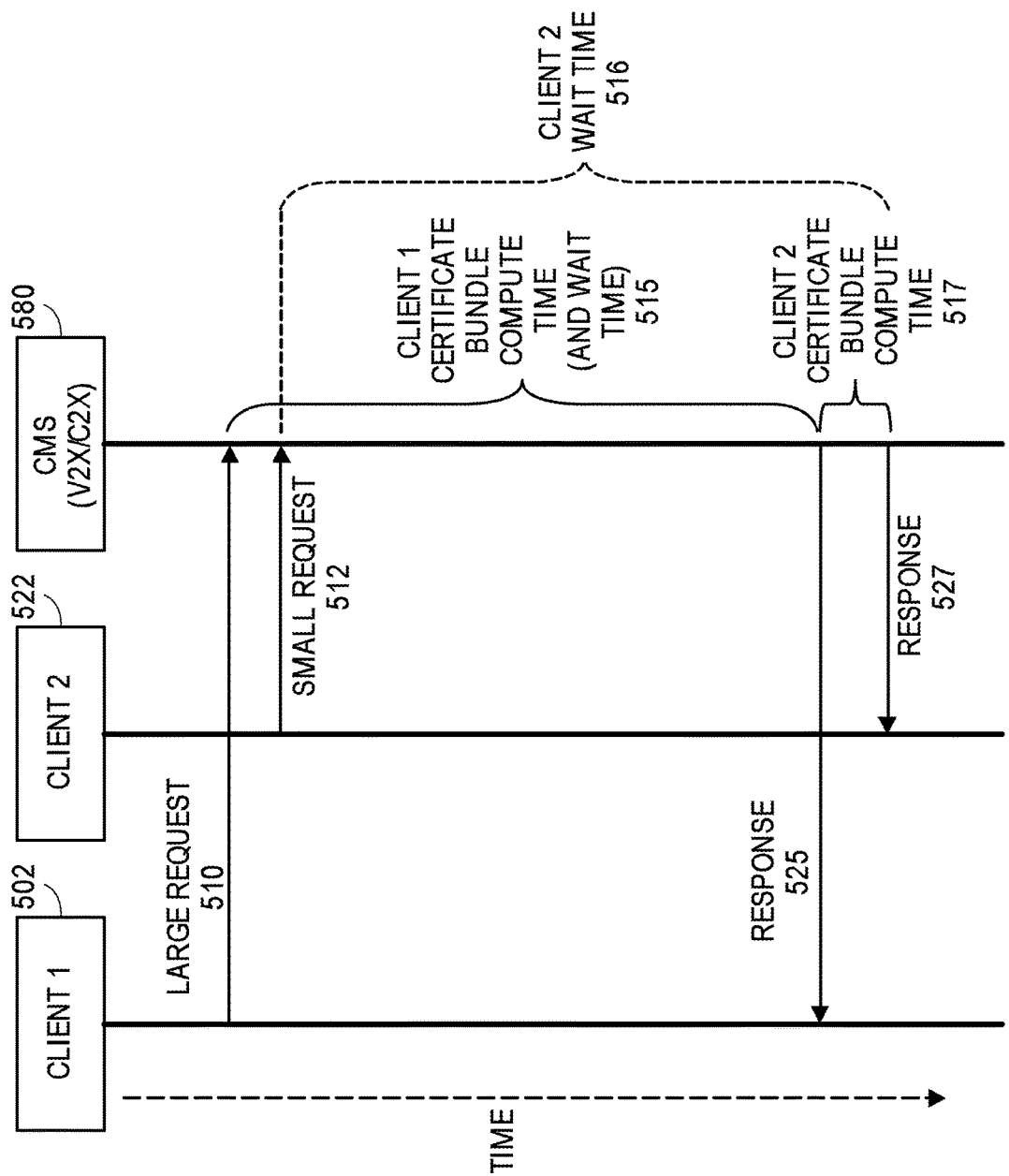
FIG. 5 is a data flow diagram illustrating example data flows between two clients and a CMS, consistent with implementations of the invention.

FIG. 5 is a data flow diagram illustrating example data flows between two clients 502, 522 and a CMS 580, consistent with implementations of the invention. For brevity, only the differences occurring within FIG. 5, as compared to FIG. 3, are described below.

In the example illustrated in FIG. 5, the CMS 580 can be a V2X CMS or a C2X CMS. In accordance with to certain implementations, the CMS 580 can host a certificate management service, such as the certificate management service 480 described above with reference to FIG. 4.

As shown in FIG. 5, client 502 (e.g., client 1) transmits a large request 510 for certificates for a large number of computerized devices (e.g., 110,000 vehicles) and client 522 (e.g., client 2), subsequent to the large request 510 from client 502, then transmits a small request 512 for certificates for a smaller number of computerized devices (e.g., 40 vehicles). In various implementations, each certificate request 510, 512 indicates: a number of computerized devices needing certificates (e.g., 110,000 for large request 510 and 40 for the small request 512); a timestamp indicating when the certificate request was transmitted; and a client requesting the certificates (e.g., respective identifiers for client 502 for the large request 510 and client 522 for the small request 512). For instance, each certificate request 510, 512 can include a client identifier for the corresponding client 502, 522 requesting the certificates. In some implementations, the client identifier uniquely identifies either client 502 or 522 and can be a unique alpha-numeric string, an authentication token, or a client credential, such as, for example, a TLS certificate, or other type of digital certificate corresponding to client 502 or 522.

FIG. 5 shows how a simple CMS 580 without a QoS manager handles the two requests 510, 512 in order, first-come, first-served. Once the large request 510 is received by the CMS 580, the CMS 580 requires a compute time 515 to perform computations needed to generate the bundle of certificates needed to fulfill the large request 510. In the example of FIG. 5, once the requested bundle of certificates have been generated, a response 525 with the requested bundle of certificates is transmitted from the CMS 580 to the client 502. That is, client 502 will only wait for the compute 515 before receiving the response 525. In this example, client 522 (e.g., client 2) must wait for wait time 516 to receive a response 527 to the small request 512. As shown, the wait time 516 for client 522 includes the entire compute time 515 required for client 1's job to be completed, and an additional compute time 517 that is required to fulfill the small request 512 before the response 527 to the small request 512 is provided. That is, even though client 2's small request 512 is for much fewer certificates than the large request 510, and can be fulfilled by the CMS 580 much quicker, the wait time 516 may be hours or days (i.e., the compute time 515 required for the large request 510 from client 502 to be fulfilled and the compute time 517 for the small request 512 to be fulfilled) instead of mere minutes that it would otherwise take to fulfill client 2's small request 512.

Figure 6:
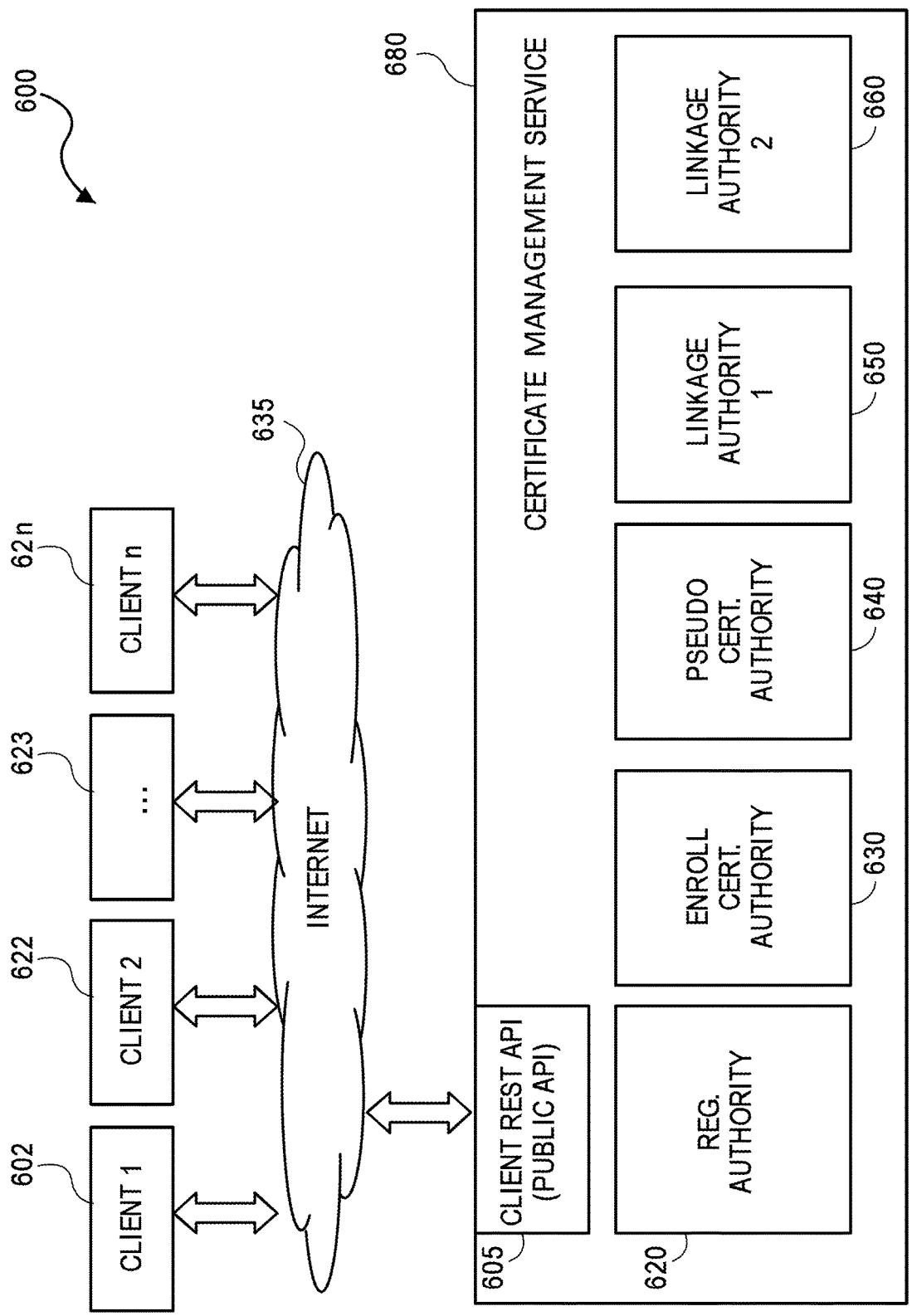
FIG. 6 is a block diagram of an example certificate management service operating in a multi-client environment, consistent with implementations of the invention.

FIG. 6 is a block diagram of an example certificate management service 680 operating in a multi-client environment 600, consistent with implementations of the invention. For brevity, only the differences occurring within FIG. 6, as compared to FIGS. 2 and 4, are described below.

In FIG. 6, the example operating environment 600 includes multiple clients 602, 622, (e.g., client 1 and client 2), 623, . . . 62n that can interact concurrently with the certificate management service 680. As shown, a group of n clients 602, 622, 623, . . . 62n can each submit respective requests for certificates for one or more computerized devices via a network 635 (e.g., the Internet). While this can cause delays similar to those described above with reference to FIGS. 4 and 5, the problem may be compounded if the clients 602, 622, 623, . . . 62n include multiple large requestors, particularly if small requests are submitted after large requests have been received by the certificate management service 680.

In the operating environment 600, the requests for certificates are received by a client REST API 605 of the certificate management service 680 (e.g., a public API of a V2X or C2X certificate management service). The certificate management service 680 accepts the requests for certificates, completes the task within a timeframe, and then returns the results (e.g., the generated certificates) to clients 602, 622, 623, . . . 62n via the network 635. The certificate management service 680 includes components for generating the requested certificates. In the example of FIG. 6, these components include a registration authority 620, an enrollment certificate authority 630, a pseudonym certificate authority 640, a linkage authority 1 650, and a linkage authority 6 660.

In additional or alternative implementations, the components of the certificate management service 680 may vary depending on whether the certificate management service 680 is configured as a V2X or C2X certificate management service. For example, as described above with reference to FIGS. 2 and 4, in implementations where the certificate management service 680 functions as a C2X certificate management service, the certificate management service 680 can include an LTCA configured to fulfill a role similar to that of the enrollment certificate authority 630. Similarly, when the certificate management service 680 is embodied as a C2X certificate management service, the certificate management service 680 can include an Authorization Authority that fulfills a role similar to that of the pseudonym certificate authority 640.

In the operating environment 600, there are multiple concurrent clients 602, 622, 623, . . . 62n (e.g., a group of n clients) that can each request work from the same certificate management service 680. In an example, clients 602, 622 (e.g., clients 1 and 2) can transmit, via the network 635, large requests for a large number of computerized devices (e.g., >100,000 vehicles) and another client 623, subsequent to client 1's and client 2's certificate requests, can transmit another large request for certificates. Then, a last client 62n in the group of n clients can transmit a small request for relatively small number of computerized devices (e.g., <50 vehicles). For a simple certificate management service (either V2X or C2X) without a QoS manager, these requests will be handled in order, on a first-come, first-served basis. In this example, client 62*n* (e.g., the last client of n clients) must wait for the preceding client's jobs to be completed before any response is provided. That is, even though a request from client 62*n* may be relatively small, the time delay may be hours or days (i.e., however long it takes for the large request from clients 602, 622, 623 to be fulfilled) instead of mere minutes that it would otherwise take to fulfill the smaller request from client 62*n*.

To resolve the above-noted issues, implementations disclosed herein advantageously employ a QoS manager (see, e.g., the QoS managers 801 and 901 of FIGS. 8 and 9) than enable a certificate management service to provide QoS levels to multiple clients so that clients such as client 62*n* do not experience inordinate delays associated with waiting for earlier, large requests to be fulfilled. For instance, as described herein with reference to FIGS. 8-10, a QoS manager can be used by the certificate management service 680 to distribute certificate requests from clients 602, 622, 623, . . . 62*n* across n corresponding, intermediary client queues, each of the n client queues corresponding to a particular client that has requested certificates. The QoS manager can also divide a client's certificate request in a client queue into smaller groups of one or more entries, each of the one or more entries having a group size corresponding to a subset of the number of computerized devices needing certificates.

Figure 7:
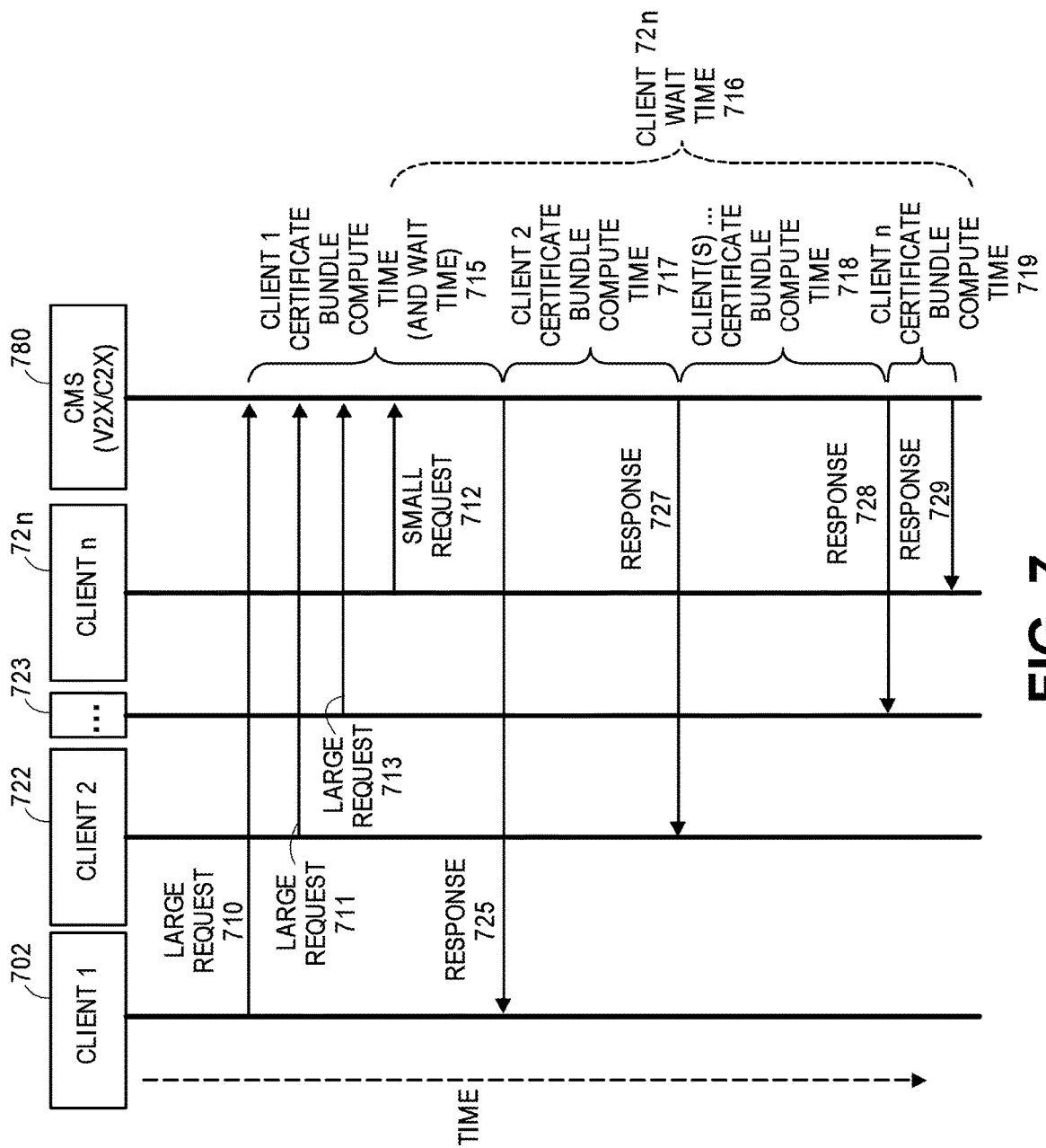
FIG. 7 is a data flow diagram illustrating example data flows between multiple clients and a CMS, consistent with implementations of the invention.

FIG. 7 is a data flow diagram illustrating example data flows between multiple clients (e.g., n clients 702, 722, 723, . . . 72*n*) and a CMS 780, consistent with implementations of the invention. For brevity, only the differences occurring within FIG. 7, as compared to FIGS. 3 and 5, are described below.

In the example illustrated in FIG. 7, the CMS 780 can be a V2X CMS or a C2X CMS. In certain implementations, the CMS 780 can host a certificate management service, such as the certificate management service 680 described above with reference to FIG. 6.

As shown in FIG. 7, client 702 (e.g., client 1) transmits a large request 710 for certificates for a large number of computerized devices (e.g., 110,000 vehicles), client 722 (e.g., client 2), subsequent to the large request 710 from client 702, then transmits another large request 711, and after that, client 723 transmits yet another large request 713. After large requests 710, 711, and 713 have been received by the CMS 780, client 72*n* transmits a small request 712 for certificates for a relatively small number of computerized devices (e.g., 40 vehicles). In some implementations, each certificate request 710, 711, 712, 713 includes data fields that indicate: a number of computerized devices needing certificates (e.g., 110,000 for large request 710 and 40 for the small request 712); a timestamp indicating when that particular certificate request was transmitted (e.g., a date and a time indicating the hour, minute, and second of transmission); and a client requesting the certificates (e.g., respective identifiers for clients 702, 722, and 723 for large requests 710, 711, and 713, and client 72*n* for the small request 712). For example, each certificate request 710, 711, 712, 713 can include a client identifier for the corresponding client 702, 722, 72*n*, 723 requesting the certificates. In some implementations, the client identifier uniquely identifies one of clients 702, 722, 723, or 72*n* and can include or be a unique alpha-numeric string, an authentication token, or a client credential, such as, for example, a TLS certificate, or other type of digital certificate.

FIG. 7 shows how a CMS 780 without a QoS manager handles the multiple requests 710, 711, 712, 713 in order, first-come, first-served. Due to the large requests 710, 711, 713 received by the CMS 780, the CMS 780 requires lengthy, sequential compute times 715, 717, and 718 to generate the large numbers of requested certificates. For instance, the CMS 780 requires compute time 715 to perform computations needed to generate the bundle of certificates needed to fulfill the large request 710 from client 702. In the example of FIG. 7, once the bundle of certificates requested by client 702 have been generated, a response 725 with the bundle of certificates is transmitted from the CMS 780 back to the client 702. That is, client 702 need only wait for the compute 715 before receiving the response 725. In this example, client 722 (e.g., client 2) must wait for wait for compute time 715 and additional compute time 717 to receive a response 727.

Lastly, client 72*n* with the small request 712 must wait the longest time of all clients 702, 722, 723, 72*n* due to the fact that its small request 712 was submitted after large requests 710, 711, and 713. That is, without the use of a QoS manager (see, e.g., QoS managers 801 and 901 of FIGS. 8 and 9, described below), client 72*n* will experience a lengthy wait time of 716 before the response 727 to the small request 712 is provided.

As shown in FIG. 7, client 72*n* must endure the wait time 716 before receiving a response 729 to the small request 712. This is because the wait time 716 for client 72*n* includes the entire compute time 715 required for client 1's job to be completed, in addition to a compute time 717 for completing client 2's request, a compute time 718 to complete the request from client 723, and a compute time 719 required to fulfill the small request 712. That is, even though client 72*n* submitted a small request 712 for much fewer certificates than the large requests 710, 711, and 713, the wait time 716 may be a duration of hours or days. This is because the wait time 716 is the sum of the combined compute times 715, 717, and 718 required for the large requests 710, 711, 713 from clients 702, 722, 723 to be fulfilled and the compute time 719 for the small request 712 to be fulfilled. Without use of the QoS managers 801 and 901 discussed below with reference to FIGS. 8 and 9, there is no mechanism for fulfilling the small request 712 from client 72*n* without first having to wait for the earlier submitted large requests 710, 711, and 713 to be fulfilled. As described below with reference to FIGS. 8-10, a QoS manager enables a CMS or certificate management service to provide QoS levels in a multi-client environment.

Figure 8:
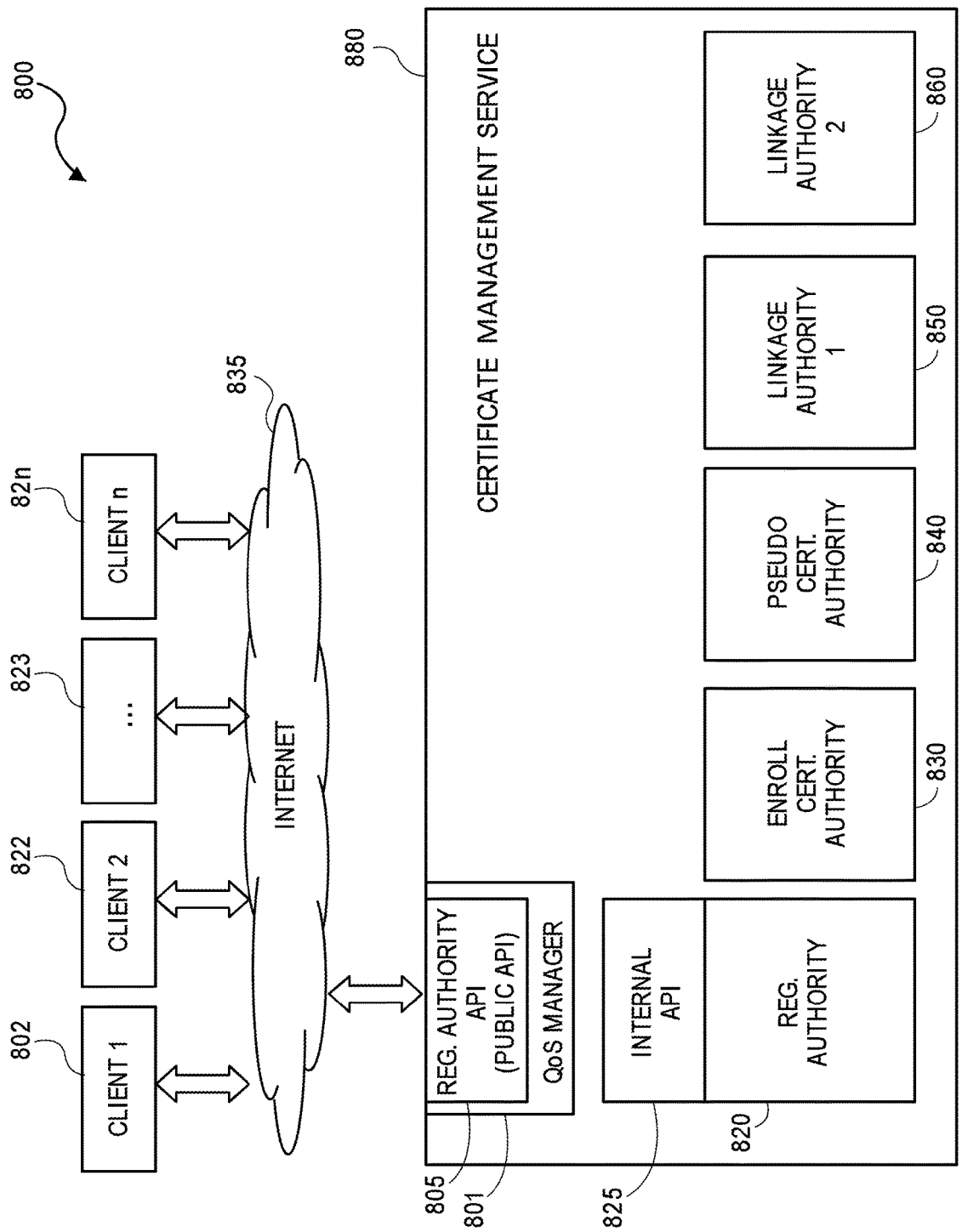
FIG. 8 is a block diagram of an example certificate management service employing a QoS manager to provide QoS levels to multiple clients, consistent with implementations of the invention.

FIG. 8 is a block diagram of an example certificate management service 880 employing a QoS manager 801 to provide QoS levels to multiple clients 802, 822, 823, . . . 82*n* in a multi-client environment 800, consistent with implementations of the invention. For brevity, only the differences occurring within FIG. 8, as compared to FIGS. 2, 4, and 6 are described below.

In FIG. 8, the example multi-client environment 800 includes multiple clients 802, 822, (e.g., clients 1 and 2 of n total clients), 823, . . . 82*n* that can interact concurrently with the certificate management service 880. The group of n clients 802, 822, 823, . . . 82*n* can each submit respective requests for certificates for one or more computerized devices via a network 835 (e.g., the Internet). While this can cause delays similar to those described above with reference to FIGS. 4, 5, and 7, the problem may be compounded if the clients 802, 822, 823, . . . 82*n* submit multiple large requests, particularly if small requests are submitted after large requests have been received by the certificate management service 880.

The certificate management service 880 includes components for fulfilling requests for certificates submitted by clients 802, 822, 823, . . . 82*n*. As illustrated in FIG. 8, these components include the QoS manager 801, a public registration authority API 805, a registration authority 820, an internal API 825 of the registration authority 820, an enrollment certificate authority 830, a pseudonym certificate authority 840, a linkage authority 1 850, and a linkage authority 8 860.

In various implementations, the public registration authority API 805 is operable to receive certificate requests from a the n clients 802, 822, 823, . . . 82*n*, where each certificate request indicates: a number of computerized devices needing certificates; a timestamp indicating when the certificate request was transmitted; and a client requesting the certificates. For instance, each certificate request can include a client identifier for one of the n clients 802, 822, 823, . . . 82*n* requesting the certificates. In some implementations, the client identifier uniquely identifies one of clients 802, 822, 823, . . . 82*n* and can include one or more of a unique alpha-numeric string, an authentication token, and a client credential, such as, for example, a TLS certificate, or other type of digital certificate.

In additional or alternative embodiments, each request can also indicate a respective client priority level, which may be based on a service tier associated with the client. In some implementations, a service tier is a numerical value corresponding to one of a plurality of tiers ranging from a lowest service level to a to highest service level (e.g., service tiers 1-10, where 1 is the lowest service level, 5 is a medium service level, and 10 is the highest service level). According to additional or alternative embodiments, each request can further indicate a request urgency level associated with the request. For example, a request urgency level for a certificate request can be designated by a client submitting the certificate request. Such request urgency levels can be numerical values corresponding to one of a plurality of levels ranging from a lowest urgency option to a highest urgency option (e.g., 1-10 where 1 is the lowest urgency, 5 is for medium urgency requests, and 10 is for most-urgent requests). In various embodiments, clients can elect to pay premiums to a service provider (e.g., an entity providing the certificate management service 880 or another entity) for increased priority and urgency levels on a per-client or per-request basis. Similarly, clients may elect to selectively lower priority and urgency levels for certain non-urgent and low-priority requests in exchange for rebates or other incentives.

Advantageously, the implementation shown in FIG. 8 employs the QoS manager 801 so as to enable the certificate management service 880 to provide QoS levels to clients 802, 822, 823, . . . 82*n* so that clients such as client 82*n* do not experience inordinate delays associated with waiting for earlier, large requests to be fulfilled. For instance, the QoS manager 801 can be used by the certificate management service 880 to distribute certificate requests from clients 802, 822, 823, . . . 82*n* across n corresponding, intermediary client queues, where each of the n client queues corresponds to a particular client that has requested certificates. The QoS manager 801 can also divide a client's certificate request in a client queue into smaller groups of one or more entries, each of the one or more entries having a group size corresponding to a subset of the number of computerized devices needing certificates. In certain implementations, the group size is a user-tunable parameter with a default value of 1.

The QoS manager 801 acts as an intermediary between the clients 802, 822, 823, . . . 82*n* and the certificate management service 880. The QoS manager 801 can accept multiple concurrent requests from any number of clients (e.g., n clients in the example of FIG. 8) and hold them in intermediary, client queues. The QoS manager 801 can break apart large requests into smaller requests and feed those smaller requests into separate client queues (not shown, but see client queues 903, 907, 909, . . . 91*n* in FIG. 9, described below). This allows smaller requests to be completed much sooner, and any number of clients can be supported. Also, by using the QoS manager 801, if additional small requests come in, then they will be allowed to complete much sooner as compared to a CMS or a certificate management service that lacks a QoS manager.

In the multi-client environment 800, the requests for certificates are received by a registration authority API 805 of the QoS manager 801 (e.g., a public API). The QoS manager 801 accepts the requests for certificates on behalf of the certificate management service 880. In various implementations, the QoS manager 801 is operable to distribute the certificate requests from the n clients 802, 822, 823, . . . 82*n* across n intermediary client queues, where each of the n client queues corresponds to a particular client requesting certificates. The QoS manager 801 can also be configured to divide a particular client's requests in that client's client queue into subgroups (i.e., smaller groups) of one or more entries, where each of the one or more entries has a group size that corresponds to a subset of a number of computerized devices that the client needs certificates for. As described in more detail with reference to FIG. 9 below, in some implementations, the QoS manager 801 includes a QoS arbiter (not shown, but see QoS arbiter 904 of FIG. 9). The QoS arbiter is operable to select a sequence of entries from the plurality of client queues to be placed onto a QoS queue based at least in part on a number of entries in the QoS queue, a latency level of the certificate management service 880, and respective timestamps indicating when the certificate requests were transmitted. According to some implementations, the QoS manager 801 is operable to retrieve entries from the QoS queue in the sequence selected by the QoS arbiter and transmit, via an internal API 825 of the registration authority 820, the retrieved entries to the certificate management service 880. Then, the QoS manager 801 forwards entries from the QoS queue to the certificate management service 880 via calls to an internal API 825 of a registration authority 820 of the certificate management service 880. The certificate management service 880 then completes the tasks forwarded to it by the QoS manager 801 within a timeframe, and then returns the results (e.g., the generated certificates) to the QoS manager 801. The QoS manager 801 then forwards the results as responses to clients 802, 822, 823, . . . 82*n* via the registration authority API 805 and the network 835.

In the operating environment 800, there are multiple concurrent clients 802, 822, 823, . . . 82*n* (e.g., a group of n clients) that can interact concurrently with the QoS manager 801, which acts as an intermediary between the n clients and the certificate management service 880. In an example, clients 802, 822 (e.g., clients 1 and 2) can transmit, via the network 835, large requests for a large number of computerized devices (e.g., >100,000 vehicles) and another client 823, subsequent to client 1's and client 2's certificate requests, can transmit another large request for certificates. Then, a last client 82*n* in the group of n clients can transmit a small request for relatively small number of computerized devices (e.g., <50 vehicles). As noted above, for the certificate management service 880 with the QoS manager 801, these requests will be placed on client queues and divided and processed in increments (e.g., subsets of a given group size) as needed in order to provide QoS levels to clients 802, 822, 823, . . . 82$n$. That is, instead of having to handle requests in order, on a first-come, first-served basis, without regard to varying size or priority of the requests, the QoS manager 801 is advantageously used to avoid having to process requests sequentially. For example, instead of requiring the last client (e.g., client 82$n$) to wait for all of the preceding client's jobs to complete before any response is provided, the QoS manager 801 enables the certificate management service 880 to fulfill a later-arriving, but smaller request from client 82$n$ to be completed without an undue delay (i.e., hours or days—however long it takes for the large request from preceding clients 802, 822, 823 to be fulfilled).

Figure 9:
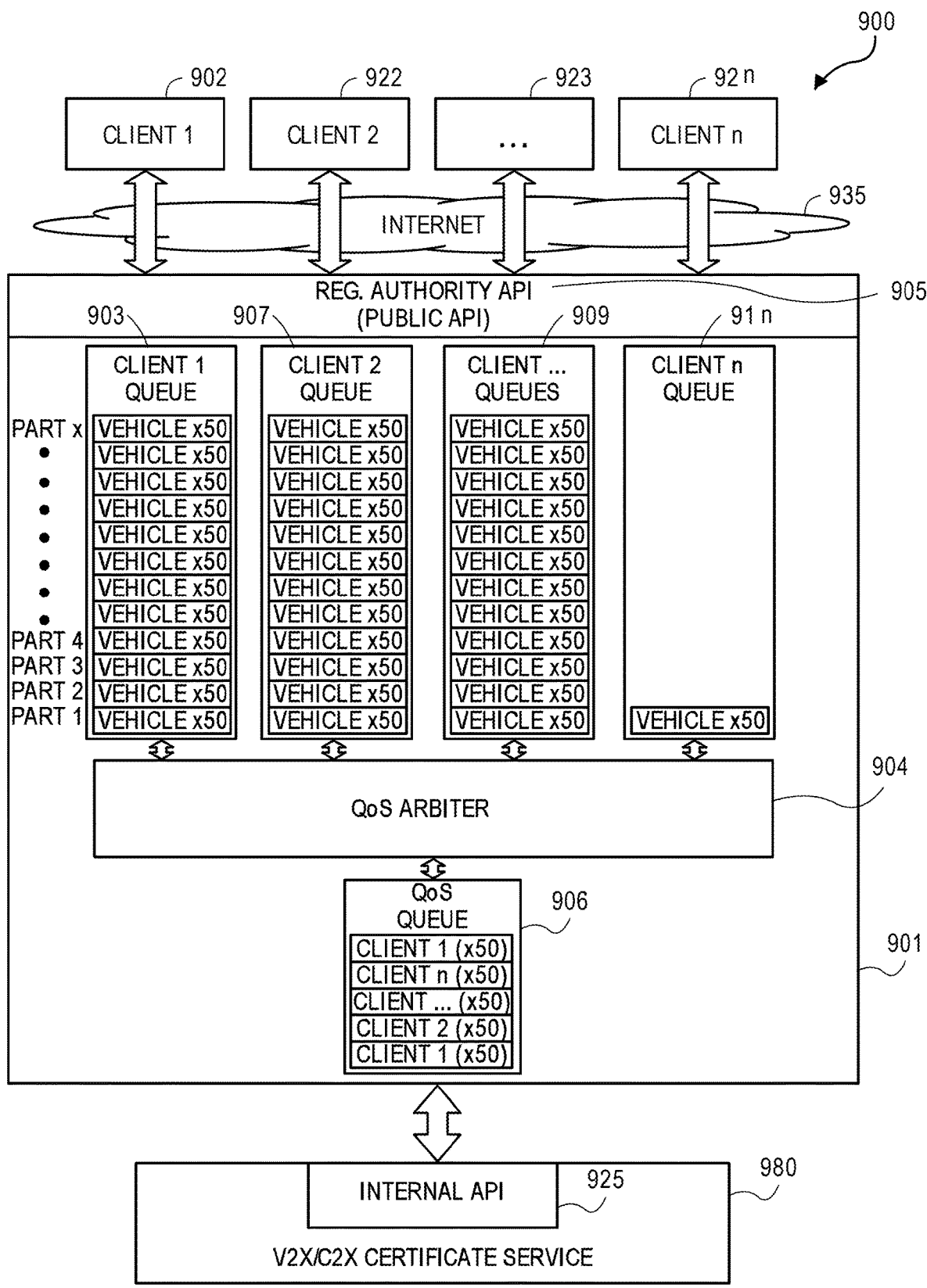
FIG. 9 is a block diagram of an example of a system for implementing a QoS manager, consistent with implementations of the invention.

FIG. 9 is a block diagram of an example of a system 900 for implementing a QoS manager 901, consistent with implementations of the invention. For brevity, only the differences occurring within FIG. 9, as compared to FIG. 8 are described below.

In FIG. 9, the example system 900 includes multiple clients 902, 922, (e.g., clients 1 and 2 of n total clients), 923, . . . 92$n$ that can interact concurrently with the QoS manager 901, which acts as an intermediary between the clients and the certificate management service 980. The plurality of clients 902, 922, 923, . . . 92$n$ can each submit respective requests for certificates for one or more computerized devices via a network 935 (e.g., the Internet in the non-limiting example of FIG. 9).

The certificate management service 980 includes components for fulfilling requests for certificates submitted by clients 902, 922, 923, . . . 92$n$. In various implementations, a public registration authority API 905 is operable to receive certificate requests from a the n clients 902, 922, 923, . . . 92$n$, where each certificate request indicates: a number of computerized devices needing certificates; a timestamp indicating when the certificate request was transmitted; and a client requesting the certificates. In additional or alternative embodiments, each request can also indicate a respective client priority level, which may be based on a service tier associated with the client. In some implementations, a service tier is a alphanumeric string or numerical value corresponding to one of a plurality of tiers ranging from a lowest service level to a to highest service level (e.g., service tiers 1-10, where 1 represents a lowest or bronze service tier, 5 represents a medium or silver tier, 7 represents a high or gold tier, and 10 represents a highest or platinum tier). According to additional or alternative embodiments, each request can further indicate a request urgency level associated with the request. For example, a request urgency level for a certificate request can be designated by a client submitting the certificate request. Such request urgency levels can be alphanumeric strings or numerical values corresponding to one of a plurality of levels ranging from a lowest urgency option to a highest urgency option (e.g., 1-10 where 1 is for low-urgency requests, 5 is a default for normal urgency requests, 7 is for very urgent request, and 10 is for extremely-urgent requests). In various embodiments, one or more of clients 902, 922, 923, . . . 92$n$ can elect to pay premiums to a service provider (e.g., an entity providing the QoS manager 901 or another entity) for increased priority and urgency levels on a per-client or per-request basis. Similarly, clients may elect to selectively lower priority and urgency levels for certain non-urgent and low-priority requests in exchange for rebates or other incentives.

Advantageously, the system 900 employs the QoS manager 901 to enable the certificate management service 980 to provide QoS levels to clients 902, 922, 923, . . . 92$n$ so that clients such as client 92$n$ do not experience inordinate delays associated with waiting for earlier, large requests to be fulfilled. For instance, the QoS manager 901 can be used by the certificate management service 980 to distribute certificate requests from clients 902, 922, 923, . . . 92$n$ across n corresponding, intermediary client queues 903, 907, 909, . . . 91$n$, where each of these n client queues corresponds to a particular client that has requested certificates. In the example of FIG. 9, client queue 903 corresponds to client 902, client queue 907 corresponds to client 922, client queue 909 corresponds to client 923, and client queue 91$n$ corresponds to client 92$n$.

As shown in FIG. 9, the QoS manager 901 can also divide a client's certificate request in a client queue into smaller groups of one or more entries, each of the one or more entries having a group size corresponding to a subset of the number of computerized devices needing certificates. In the non-limiting example of FIG. 9, the group size is 50 (e.g., certificates for 50 vehicles). However, it is to be understood that in alternative implementations, the group size can be any number and the certificates can be for any computerized device (i.e., not limited to vehicles). For instance, the group size can vary by client, and in certain implementations, the size is 1 computerized device per queue entry in the client queues 903, 907, 909, . . . 91$n$. In alternative or additional implementations, the group size is a user-tunable parameter with a default value of 1. In an alternative implementation, the system 900 can use a pooled queue approach instead of the dedicated client queues 903, 907, 909, . . . 91$n$ shown in FIG. 9. For instance, the client queues need not be dedicated per client with a one-to-one mapping between each of the n clients and number of client queues as shown in FIG. 9. That is, instead of the system 900 having a dedicated (predetermined) client queue per customer, a pooled queue implementation can utilize a pool of queues and only allocate a given queue from the pool of queues when a client is active. That is, with the pooled queue implementation, a queue may only be allocated for a client when that client has submitted a certificate request (i.e., when a client is active). One benefit to the dedicated queue implementation is that the system 900 does not require any logic or execution of instructions to allocate a queue when a client changes a client state from inactive to active or active to inactive. One benefit for the pooled queue implementation is that the work that a QoS arbiter 904 has to perform can be optimized when searching for active jobs to be placed on the QoS queue 906. That is, with the pooled queue implementation, the QoS arbiter 904 will only need to scan queues of active clients with current, pending certificate requests (as opposed to potentially having to scan empty, dedicated client queues for inactive clients).

The QoS manager 901 acts as an intermediary between the clients 902, 922, 923, . . . 92$n$ and the certificate management service 980. The QoS manager 901 can accept multiple concurrent requests from any number of clients (e.g., n clients in the example of FIG. 9) and hold them in intermediary, client queues 903, 907, 909, . . . 91$n$. As shown in FIG. 9, the QoS manager 901 breaks apart large requests into smaller requests and feeds those smaller requests into separate, respective ones of the client queues 903, 907, 909, . . . 91$n$. This allows smaller requests to be completed much sooner, and any number of clients can be supported.

Also, by using the QoS manager 901, if additional small requests come in after large requests have been received, then those small requests will be allowed to complete much sooner as compared to a CMS or a certificate management service that lacks the QoS manager 901.

In the system 900, the requests for certificates are received by a registration authority API 905 of the QoS manager 901 (e.g., a public API). The QoS manager 901 accepts the requests for certificates on behalf of the certificate management service 980. In various implementations, the QoS manager 901 is operable to distribute the certificate requests from the n clients 902, 922, 923, . . . 92n across n intermediary client queues, where each of the n client queues corresponds to a particular client requesting certificates. The QoS manager 901 can also be configured to divide a particular client's requests in that client's client queue into smaller groups of one or more entries, where each of the one or more entries has a group size that corresponds to a subset of a number of computerized devices that the client needs certificates for (see, e.g., parts 1, 2, 3, 4, . . . x in client queue 903). That is, the QoS manager 901 can break apart large certificate requests from a given client into smaller pieces and place those smaller pieces into that client's client queue.

In various implementations, the QoS manager 901 includes the QoS arbiter 904. The QoS arbiter 904 selects entries from the client queues to be placed into a QoS queue 906. In certain implementations, the QoS arbiter 904 is operable to select the sequence of entries from the client queues 903, 907, 909, . . . 91n to be placed onto the QoS queue 906 using a round robin technique. That is, the QoS arbiter 904 can sequentially select entries from each of the client queues 903, 907, 909, . . . 91n, moving in order starting with the first client queue 903, and progressing in sequence through each of the other client queues 907, 909, . . . 91n. The QoS arbiter 904 throttles the entries, by only placing just enough entries onto the QoS queue 906 as needed. For example, the QoS queue 906 can be limited in the number of entries allowed. To improve efficiency of the system 900, the number of entries allowed can be set to a large enough value to ensure that the certificate management service 980 is always busy, but small enough to minimize latency. That is, the queue depth of the QoS queue 906 is limited, and this limit is known by the QoS arbiter 904.

The QoS arbiter 904 can seek to minimize the size of the QoS queue 906 so as to allow new requests to come in and be placed onto the QoS queue 906. In some implementations, even though the QoS arbiter 904 may have placed items in the QoS queue 906 in a certain order, a later arriving, but high-priority request can be inserted at the head of the QoS queue 906 queue and not at the tail of the queue. In other words, new entries in the QoS queue 906 are typically placed or set at the tail of the QoS queue 906. The head of the QoS queue 906 is FIG. 9 is the entry for client 1 that is on the bottom of the QoS queue 906 (e.g., Client 1 (x50)). This entry, at the head of the QoS queue 906 that will be the next entry that goes to the certificate management service 980 via an internal API 925. However, in some instances, the QoS arbiter 904 can elect to insert new entries at the head of the QoS queue 906, or anywhere in-between the head and the tail. For example, the placement of entries in the QoS queue 906 by the QoS arbiter 904 can be based on a client priority level and/or certificate request urgency that are indicated in a certificate request.

In some implementations, the QoS arbiter 904 is further operable to dynamically re-order the sequence of entries placed onto the QoS queue 906 based at least in part on additional certificate requests received from additional clients (e.g., requests received from new clients after the request from client 92n). Further, for example, a sequence of entries in the QoS queue 906 can be determined by the QoS arbiter 904 based on a dynamic priority assigned to each of the client queues 903, 907, 909, . . . 91n where the respective, dynamic priority assigned to each of the client queues 903, 907, 909, . . . 91n is assigned by the QoS arbiter based at least in part on a number of entries in each of the client queues 903, 907, 909, . . . 91n.

In various implementations, the QoS arbiter 904 is operable to select a sequence of entries from the n client queues 903, 907, 909, . . . 91n to be placed onto the QoS queue 906 based at least in part on a number of entries in the QoS queue 906, a latency level of the certificate management service 980, and respective timestamps indicating when the certificate requests were transmitted.

In the example of FIG. 9, the QoS arbiter 904 has selected a sequence of entries from multiple clients (e.g., client 1, client 2 . . . client n) to be placed onto the QoS queue 906 using a round robin technique. In additional or alternative implementations, the QoS arbiter 904 is further operable to select the sequence of entries from the n client queues 903, 907, 909, . . . 91n to be placed onto the QoS queue 906 based on request urgency levels or client priority levels that may be indicated in the certificate requests. For example, instead of using a round robin technique to select the sequence of entries from the client queues 903, 907, 909, . . . 91n between all of the clients 902, 922, 923, . . . 92n, the QoS arbiter 904 can select the sequence of entries based on rules that change the balance between clients. For instance, the sequence of entries may be determined based on respective client priority levels that indicate higher-priority, higher-paying clients (e.g., certain vehicle manufacturers) and lower-priority, lower-paying clients (e.g., certain universities who may only want to pay for idle time processing). In this example, the QoS arbiter 904 will place entries from higher-priority clients on the QoS queue 906 ahead of entries from lower-priority clients. Also, for example, the sequence of entries may be determined based on respective request urgency levels, with QoS arbiter 904 placing entries corresponding to more-urgent requests on the QoS queue 906 ahead of entries corresponding to less-urgent requests. In additional implementations, the QoS arbiter 904 may select the sequence of entries for the QoS queue 906 based on rate limiting rules that indicate that the certificate management service 980 should never process more than a certain number of certificates per client per unit time (e.g., limit a given client to no more than x number of certificates per hour or per day).

In the system 900, a given client of the clients 902, 922, 923, . . . 92n may have multiple, concurrent certificate requests. In certain implementations, the QoS manager 901 may not make distinctions between multiple requests from the same client. In alternative or additional implementations, the QoS manager 901 can further break concurrent requests from a single client into pieces based on rules. According to an example implementation, the QoS manager 901 can divide a client's requests based on respective request urgency levels the client provides to the system 900 and a rule to enforce urgency levels amongst requests from that client. In this example implementation, the QoS manager 901 may instruct the QoS arbiter 904 what order to process parts of multiple requests from a given client based on urgency levels that client provides for each of its certificate requests. In another implementation, a client can allow the QoS manager 901 to use a round-robin technique to select a sequence of entries across all of that client's certificate requests.

In additional or alternative implementations, the QoS arbiter 904 is further operable to select the sequence of entries from the n client queues 903, 907, 909, . . . 91n to be placed onto the QoS queue 906 based on request urgency levels or client priority levels that may be indicated in the certificate requests. As shown in FIG. 9, the QoS arbiter 904 has selected a sequence of entries from multiple clients (e.g., client 1, client 2 . . . client n) to be placed onto the QoS queue 906.

In certain implementations, the certificate management service 980, via calls to the internal API 925, pulls entries from the QoS queue 906. However, as noted above, a new request (from a new client, not one of 902, 922, 923, 92n), or a new request from one of clients 902, 922, 923, 92n that is higher priority than other entries in QoS queue 906, then the QoS arbiter 904 may put the new, higher priority entry in the QoS queue 906 as the next entry for the CMS 980 to process. In an implementation, the QoS arbiter 904 can temporarily freeze or pause the QoS queue 906 and not allow the certificate management service 980 to pull any more entries from the QoS queue 906 until the new, higher priority entry is placed onto the QoS queue 906. In an alternative implementation, the QoS arbiter 904 can remove a lower priority entry from the QoS queue 906 in order to replace it with a higher priority entry, and the QoS arbiter 904 can place the removed entry back on the corresponding client queue.

According to some implementations, the QoS manager 901 is operable to retrieve entries from the QoS queue 906 in the sequence selected by the QoS arbiter 904 and transmit, via the internal API 925, the retrieved entries to the certificate management service 980. Then, the QoS manager 901 forwards entries from the QoS queue to the certificate management service 980 via calls to an internal API 925 of a registration authority of the certificate management service 980. The certificate management service 980 then completes the tasks forwarded to it by the QoS manager 901 within a timeframe, and then returns the results (e.g., the generated certificates) to the QoS manager 901. The QoS manager 901 then forwards the results as responses to clients 902, 922, 923, . . . 92n via the registration authority API 905 and the network 935.

In the system 900, there are a plurality of clients 902, 922, 923, . . . 92n (e.g., a group of n clients) that can each request work from the same certificate management service 980, via the QoS manager 901. That is, multiple concurrent clients 902, 922, 923, . . . 92n can interact concurrently with the QoS manager 901, which acts as an intermediary between the n clients and the certificate management service 980. In the example shown in FIG. 9, clients 902, 922 (e.g., clients 1 and 2) can transmit, via the network 935, large requests for a large number of computerized devices (e.g., >100,000 vehicles) and another client 923, subsequent to client 1's and client 2's certificate requests, can transmit another large request for certificates. Then, a last client 92n in the group of n clients can transmit a small request for relatively small number of computerized devices (e.g., <50 vehicles). As noted above, for the system 900 that includes the QoS manager 901, these requests will be placed on client queues 903, 907, 909, . . . 91n and divided and processed in increments (e.g., subsets of group size 50 in the non-limiting example of FIG. 9) in order to provide QoS levels to clients 902, 922, 923, . . . 92n. That is, instead of having to handle requests from clients 902, 922, 923, . . . 92n sequentially, on a first-come, first-served basis, without regard to varying size or priority of the requests, the QoS manager 901 advantageously prevents the system 900 from having to process requests in a sequential order. For instance, rather than require that the last client (e.g., client 92n) wait for the preceding client's jobs to complete before any response is provided, the QoS manager 901 enables the certificate management service 980 to fulfill a later-arriving, but smaller request from client 92n to be completed without an undue delay (i.e., hours or days—however long it takes for the large request from preceding clients 902, 922, 923 to be fulfilled).

Figure 10:
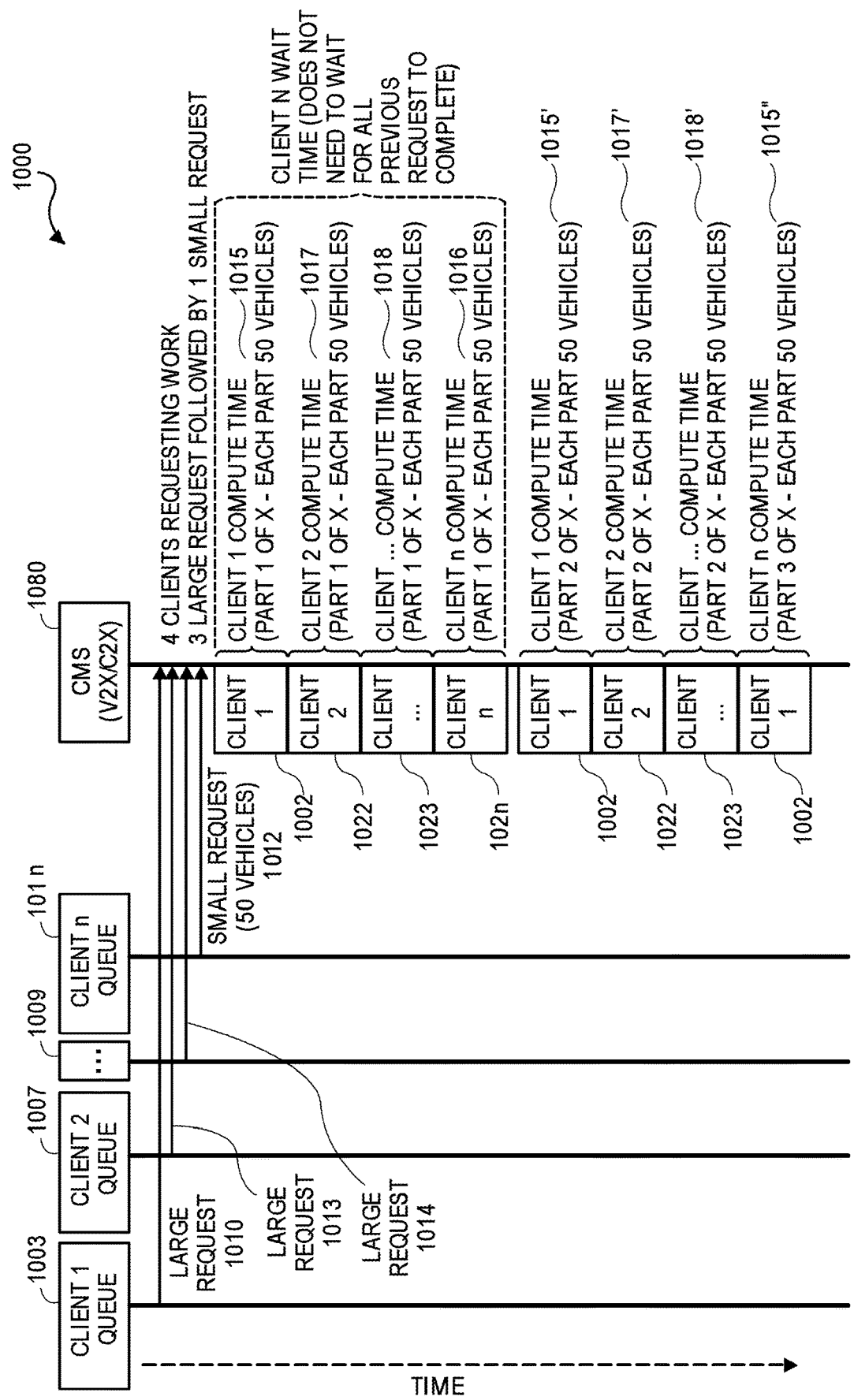
FIG. 10 is a data flow diagram illustrating example data flows between multiple clients and a certificate management system employing a QoS manager, consistent with implementations of the invention.

FIG. 10 is a data flow diagram illustrating example data flows between multiple client queues 1003, 1007, 1009, . . . 101n and a CMS 1080 employing a QoS manager, consistent with implementations of the invention. For brevity, only the differences occurring within FIG. 10, as compared to FIG. 7, are described below.

In the example depicted in FIG. 10, the CMS 1080 can be a V2X CMS or a C2X CMS. In certain implementations, the CMS 1080 can host a certificate management service, such as the certificate management service 980 described above with reference to FIG. 9. In some implementations, a QoS manager with a QoS arbiter (e.g., the QoS manager 901 and QoS arbiter 904 described above with reference to FIG. 9) can select entries from the n client queues 1003, 1007, 1009, . . . 101n to be submitted to the CMS 1080.

As shown in FIG. 10, the CMS 1080 receives a large request 1010 for certificates from a client queue 1003 for a first client (e.g., client 1), and subsequent to the large request 1010, another large request 1013 from client queue 1007 for a second client (e.g., client 2) is received, and after that, yet another large request 1014 is received from client queue 1009. After large requests 1010, 1013, and 1014 have been received by the CMS 1080, a small request 1012 for certificates for a relatively small number of computerized devices (e.g., 50 vehicles) is received from client queue 101n. In some implementations, each certificate request 1010, 1013, 1014, 1012 includes data fields that indicate: a number of computerized devices needing certificates (e.g., 110,000 for large request 1010 and 50 for the small request 1112); a timestamp indicating when that particular certificate request was transmitted (e.g., a date and a time indicating the hour, minute, and second of transmission); and a client requesting the certificates (e.g., respective identifiers for clients 1002, 1022, and 1023 for large requests 1010, 1011, and 1013, and client 102n for the small request 1012).

FIG. 10 shows how a CMS 1080 with a QoS manager handles the multiple requests 1010, 1012, 1013, 1014. By using a QoS manager and its QoS arbiter, the later arriving, smaller request 1012 can be fulfilled without having to wait for the large requests 1010, 1013, 1014 to first be fulfilled. That is, FIG. 10 shows how the smaller request 1012 from client queue 101n does not need to wait for all previous requests 1010, 1013, 1014 to complete. In other words, the lengthy, sequential compute times associated with completing all of the large requests 1010, 1013, 1014 need not elapse before the CMS 1080 fulfills small request 1012. This is accomplished by the QoS manager breaking the requests 1010, 1012, 1013, 1014 into parts that are placed in the client queues 1003, 1007, 1009, . . . 101n. These parts are subgroups (i.e., smaller groups) of one or more entries, each of the one or more entries having a group size corresponding to a subset of the number of computerized devices needing certificates. In the non-limiting example of FIG. 10, the group size is 50 and the certificates are requested for vehicles. In alternative or additional embodiments, the group size is a tunable numeric value with a default value of 1 and the certificates can be for a variety of computerized devices requiring security credentials.

As shown in FIG. 10, the CMS 1080 requires a compute time 1015 to perform computations needed to generate a first part of a bundle of certificates needed to fulfill the large request 1010 from client 1002 (e.g., part 1 of client 1's request). In the example of FIG. 10, only part 1 of a bundle of certificates requested by client 1002 (e.g., client 1) is generated before moving onto a first part of the large request 1013 from client 1022 (e.g., part 1 of client 2's request), which requires a compute time 1017. Next, part 1 of the large request 1014 from client 1023 is processed, which requires a compute time 1018. Then, the small request 1012 from client $102n$ is processed in compute time 1016. By using the QoS manager to divide large requests, client $102n$ need only wait the amount of time for part 1 of the large requests 1010, 1013, 1014 from clients 1002, 1022, 1023 to be completed. This is despite the fact that small request 1012 was submitted after large requests 1010, 1011, and 1013. Without the use of a QoS manager (see, e.g., QoS manager 901 of FIG. 9, described above), client $102n$ would experience a lengthy wait time before a response to the small request 1012 is provided because client $102n$ would have to wait for all parts of large requests 1010, 1013, 1014 to be completed before the small request 1012 would be fulfilled.

As shown in FIG. 10, client $102n$ need only wait a total of the part 1 compute times 1015, 1017, 1018, and 1016 before receiving a response to the small request 1012. This is because the wait time for client $102n$ does not include the entire compute time required for all parts of large requests 1010, 1013, 1014 to be completed. Instead, client $102n$ only has to wait for the relatively small compute times 1015, 1017 and 1018 for completing first parts of the large requests 1010, 1013, 1014, in addition to a compute time 1016 for completing the small request 1012. That is, even though client $102n$ submitted a small request 1012 after the large requests 1010, 1011, and 1013, the wait time will be much shorter than in cases where a QoS manager is not used. This is because without a QoS manager to divide the large requests 1010, 1013, 1014 into parts, the wait time for client $102n$ would be the sum of the entire, combined compute times required for the large requests 1010, 1013, 1014 from clients 1002, 1022, 1023 to be fulfilled and the compute time 1016 for the small request 1012 to be fulfilled. Without use of the QoS manager 901 discussed above with reference to FIG. 9, there is no mechanism for fulfilling the small request 1012 from client $102n$ without first having to wait for the earlier submitted large requests 1010, 1013, and 1014 to be fulfilled. That is, the QoS manager enables the CMS 1080 to provide QoS levels in a multi-client environment.

Next, after the small request 1012 has been fulfilled, the CMS 1080 processes part 2 of the large request 1010 from client 1002, which requires a compute time 1015'. Next, part 2 of the large request 1013 from client 1022 (e.g., part 2 of client 2's request) is processed, which requires a compute time 1017'. Then, part 2 of the large request 1014 from client 1023 is processed, which requires a compute time 1018'. At this point, since the small request 1012 from client $102n$ has already been fulfilled, the CMS 1080 processes part 3 of the large request 1010 from client 1002, which requires a compute time 1015". Remaining parts of the large requests 1010, 1013, and 1014 will be processed in this manner until these requests have been fulfilled.

In some implementations, a QoS arbiter (e.g., the QoS arbiter 904 of FIG. 9) can dynamically re-order the sequence of entries placed onto a QoS queue used by the CMS 1080. In this way, the sequence of request parts that the CMS 1080 processes can be dynamically changed. For example, the sequence of entries can be changed in response to the QoS manager receiving additional certificate requests from additional clients (i.e., a request subsequent to small request 1012 from a new client). Further, for example, the sequence of entries can be based on a client priority level and/or certificate request urgency that are indicated in a certificate request. Also, for example, the sequence of entries can be changed based on a dynamic priority assigned to each of the client queues 1003, 1007, 1009, . . . $101n$, where the respective, dynamic priority assigned to each of the client queues 1003, 1007, 1009, . . . $101n$ is assigned by the QoS arbiter based at least in part on a number of entries in each of the client queues 1003, 1007, 1009, . . . $101n$.

Figure 11:
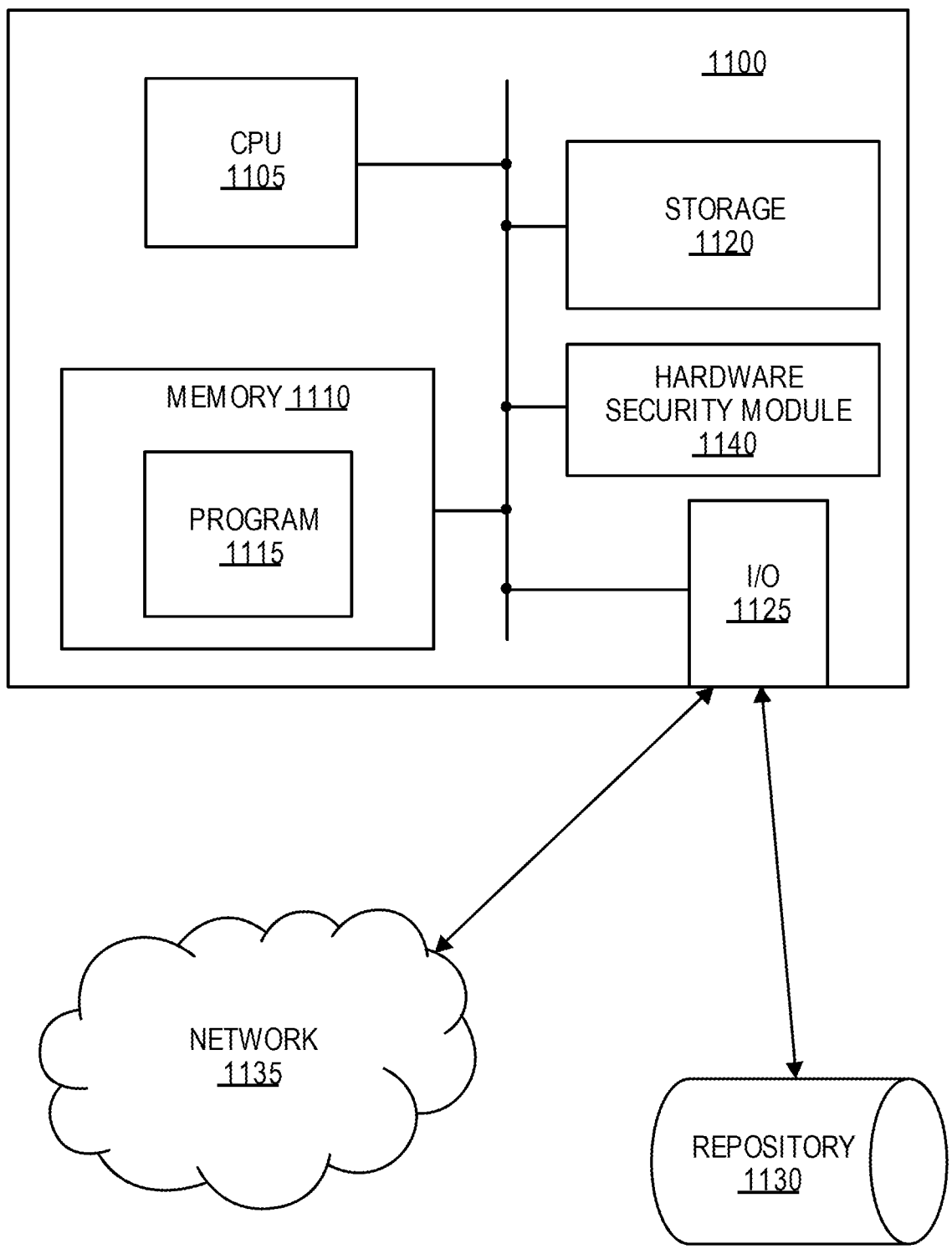
FIG. 11 is a block diagram of an example of a computing system that may be used for hosting systems and methods consistent with implementations of the invention.

FIG. 11 is a block diagram of an example of a computing environment 1101, which includes a computing system 1100 that may be used for implementing systems and methods consistent with implementations of the invention. Other components and/or arrangements may also be used. In some implementations, computing system 1100 may be used to implement, at least partially, various components of FIGS. 1-10, such as the distributor appliance 108, the registration authority 120, the linkage authorities 150, 160, the pseudonym certificate authority 140, and the enrollment certificate authority 130 of FIGS. 1A and 1B, the components of the certificate management services 280, 480, 680, 880 of FIGS. 2, 4, 6, and 8, the QoS manager 901 of FIG. 9, and the certificate management systems (CMSs) 380, 580, 780, 1080 of FIGS. 3, 5, 7, and 10 among other things. In some implementations, a series of computing systems similar to computing system 1100 may be each customized with specialized hardware and/or programmed as a specialized server to implement one of the components of FIGS. 1-10, which may communicate with each other via a network 1135.

In the example shown in FIG. 11, the computing system 1100 includes a number of components, such as a CPU 1105, a memory 1110, an input/output (I/O) device(s) 1125, a hardware security module (HSM) 1140, and a nonvolatile storage device 1120. System 1100 can be implemented in various ways. For example, an implementation as an integrated platform (such as a server, workstation, personal computer, laptop, etc.) may comprise a CPU 1105, a memory 1110, a nonvolatile storage 1120, and I/O devices 1125. In such a configuration, the components 1105, 1110, 1120, and 1125 may connect and communicate through a local data bus and may access a data repository 1130 (implemented, for example, as a separate data source or database system) via an external I/O connection. The I/O component(s) 1125 may connect to external devices through a direct communication link (e.g., a hardwired or local wifi connection), through a network, such as a local area network (LAN) or a wide area network (WAN, such as a cellular telephone network or the Internet), and/or through other suitable connections. System 1100 may be standalone or it may be a subsystem of a larger system.

The CPU 1105 may be one or more known processor or processing devices, such as a microprocessor from the Core™ family manufactured by the Intel™ Corporation of Santa Clara, Calif. or a microprocessor from the Athlon™ family manufactured by the AMD™ Corporation of Sunnyvale, Calif. The memory 1110 may be one or more fast storage devices configured to store instructions and information executed or used by the CPU 1105 to perform certain functions, methods, and processes related to implementations of the present invention. The storage 1120 may be a volatile or non-volatile, magnetic, semiconductor, tape, optical, or other type of storage device or computer-readable medium, including devices such as CDs and DVDs and solid state devices, meant for long-term storage.

In the illustrated implementation, the memory 1110 contains one or more programs or applications 1115 loaded from the storage 1120 or from a remote system (not shown) that, when executed by the CPU 1105, perform various operations, procedures, processes, or methods consistent with the present invention. Alternatively, the CPU 1105 may execute one or more programs located remotely from the system 1100. For example, the system 1100 may access one or more remote programs via the network 1135 that, when executed, perform functions and processes related to implementations of the present invention.

In certain implementations, the memory 1110 may include a program(s) 1115 for performing the specialized functions and operations described herein for the CMS host with the registration authority 120, the distributor appliance 108, the certificate management services 280, 480, 680, 880, the CMSs 380, 580, 780, 1080, the QoS manager 801, 901, and/or the QoS arbiter 904. In some implementations, the memory 1110 may also include other programs or applications that implement other methods and processes that provide ancillary functionality to the invention.

The memory 1110 may be also be configured with other programs (not shown) unrelated to the invention and/or an operating system (not shown) that performs several functions well known in the art when executed by the CPU 1105. By way of example, the operating system may be Microsoft Windows™, Unix™, Linux™, an Apple Computers™ operating system, or other operating system. The choice of operating system, and even to the use of an operating system, is not critical to the invention.

The HSM 1140 may be a device with its own processor that securely generates and stores digital security assets and/or securely performs a variety of cryptographic and sensitive computations. The HSM 1140 protects digital security assets, such as cryptographic keys, and other sensitive data from possible access by an attacker. In some implementations, the HSM may be a plug-in card or board that attaches directly to the computing system 1100.

The I/O device(s) 1125 may comprise one or more input/output devices that allow data to be received and/or transmitted by the system 1100. For example, the I/O device 1125 may include one or more input devices, such as a keyboard, touch screen, mouse, and the like, that enable data to be input from a user. Further, the I/O device 1125 may include one or more output devices, such as a display screen, a CRT monitor, an LCD monitor, a plasma display, a printer, speaker devices, and the like, that enable data to be output or presented to a user. The I/O device 1125 may also include one or more digital and/or analog communication input/output devices that allow the computing system 1100 to communicate, for example, digitally, with other machines and devices. Other configurations and/or numbers of input and/or output devices may be incorporated in the I/O device 1125.

In the implementation shown, the system 1100 is connected to a network 1135 (such as the Internet, a private network, a virtual private network, a cellular network or other network or combination of these), which may in turn be connected to various systems and computing machines, such as servers, personal computers, laptop computers, client devices, etc. In general, the system 1100 may input data from external machines and devices and output data to external machines and devices via the network 1135.

In the exemplary implementation shown in FIG. 11, the repository 1130 is a standalone data source external to system 1100, such as a database. In other implementations, the repository 1130 may be hosted by the system 1100. In various implementations, the repository 1130 may manage and store data used to implement systems and methods consistent with the invention. For example, the repository 1130 may manage and store data structures that contain the status and log information for each computerized device that has certificates provisioned by the distributor appliance 108, and the like.

The repository 1130 may comprise one or more databases that store information and are accessed and/or managed through the system 1100. By way of example, the repository 1130 may be an Oracle™ database, a Sybase™ database, or other relational database. Systems and methods consistent with the invention, however, are not limited to separate data structures or databases, or even to the use of a database or data structure.

One of ordinary skill will recognize that the components and implementation details of the system in FIG. 11 are examples presented for conciseness and clarity of explanation. Other components and implementation details may be used.

Although the foregoing examples use specific examples of computerized devices, such a OBUs, ECUs, and RSUs, for clarity of explanation, the invention is not limited to those specific examples. Various implementations consistent with the invention may be used with and for a wide variety of computerized devices, such as medical device (e.g., dialysis machines, infusion pumps, etc.); robots; drones; autonomous vehicles; and wireless communication modules (e.g., embedded Universal Integrated Circuit Cards (eUICC)), among others.

The various operations of the applications described herein may be performed, at least partially, by one or more VMs. In additional or alternative implementations, the operations of the applications described herein may be performed, at least partially by one or more processors that are temporarily configured (e.g., by software) or permanently configured to perform the relevant operations. Whether temporarily or permanently configured, such processors may constitute processor-implemented modules that operate to perform one or more application operations, functions, and roles described herein. As used herein, the term 'processor-implemented module' refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a 'cloud computing' environment or as a 'software as a service' (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within an office environment, a manufacturing environment, or a server farm). In other example embodiments, the processors or processor-implemented modules may be distributed across a number of geographic locations.

Other implementations of the invention will be apparent to those skilled in the art from consideration of the specification and practice of the invention disclosed herein. It is intended that the specification and examples be considered as exemplary only, with a true scope of the invention being indicated by the claims below.

What is claimed is:

1. A system for providing quality of service (QoS) levels to clients requesting certificates from a certificate management service, wherein the system comprises:
    an application programming interface (API) operable to receive certificate requests from a plurality of clients, each certificate request including information indicating:
        a number of computerized devices needing certificates;
        a timestamp indicating when the certificate request was transmitted; and
        a client identifier that specifies a client requesting the certificates;
    a QoS manager operable to:
        distribute the certificate requests from the plurality of clients across a plurality of client queues, each of the plurality of client queues corresponding to a particular client requesting certificates;
        divide a client's certificate request in a client queue into subgroups of one or more entries, each of the one or more entries having a group size corresponding to a subset of the number of computerized devices needing certificates; and
        transmit retrieved entries from the plurality of client queues to the certificate management service.

2. The system of claim 1, wherein the system comprises a QoS arbiter operable to select a sequence of entries from the plurality of client queues to be placed onto a QoS queue based at least in part on a number of entries in the QoS queue, a latency level of the certificate management service, or the timestamps indicating when the certificate requests were transmitted.

3. The system of claim 2, wherein the QoS manager is operable to transmit the retrieved entries from the plurality of client queues to the certificate management service by obtaining the retrieved entries from the QoS queue in the sequence selected by the QoS arbiter.

4. The system of claim 3, wherein:
    an OBU is operable to be installed in one or more of a vehicle, a watercraft, an aircraft, a spacecraft, a medical device, a robot, a drone, a wireless communication module, a wired communication module, and an Internet of Things (IoT) device;
    an ECU is operable to be installed in one or more of a vehicle, a boat, an aircraft, a spacecraft, a medical device, a robot, a drone, a wireless communication module, a wired communication module, and an IoT device; and
    an RSU is operable to be installed in one or more of a traffic control device, a wireless communication module, a digital billboard, and an electronic sign.

5. The system of claim 3, wherein each certificate request further includes additional information indicating a client priority level of a client submitting the request, and wherein the QoS arbiter is further operable to select the sequence of entries from the plurality of client queues to be placed onto the QoS queue based at least in part on a respective client priority level indicated in a certificate request.

6. The system of claim 5, wherein the client priority level for a client is based on a service tier associated with the client, and wherein a service tier corresponds to one of a plurality of tiers ranging from a lowest service level to a highest service level.

7. The system of claim 5, wherein the QoS arbiter is further operable to dynamically re-order the sequence of entries placed onto the QoS queue based at least in part on respective client priority levels indicated in additional certificate requests received from additional clients.

8. The system of claim 3, wherein each certificate request further indicates a request urgency level associated with the request, and wherein the QoS arbiter is operable to select the sequence of entries from the plurality of client queues to be placed onto the QoS queue based at least in part on a respective request urgency level indicated in a certificate request.

9. The system of claim 8, wherein a request urgency level for a certificate request is designated by a client submitting the certificate request, and wherein a request urgency level corresponds to one of a plurality of levels ranging from a lowest urgency option to a highest urgency option.

10. The system of claim 2, wherein the QoS arbiter is operable to select the sequence of entries from the plurality of client queues to be placed onto the QoS queue using a round robin technique.

11. The system of claim 2, wherein the QoS arbiter is operable to select the sequence of entries from the plurality of client queues to be placed onto the QoS queue based on a dynamic priority assigned to each of the client queues, and wherein the respective, dynamic priority assigned to each of the client queues is assigned by the QoS arbiter based at least in part on a number of entries in each of the client queues.

12. The system of claim 1, wherein the computerized devices needing certificates correspond to one or more of an On Board Unit (OBU), an Electronic Control Unit (ECU), and a Road-Side Unit (RSU).

13. The system of claim 1, wherein the plurality of clients include at least one distributor appliance or server that is operable to act as a proxy between the certificate management service and at least one computerized device needing certificates.

14. The system of claim 1, wherein the certificate requests from the plurality of clients include requests for enrollment certificates, and wherein the API is further operable to:
    transmit, to the plurality of clients, enrollment certificates generated by an enrollment certificate authority of the certificate management service.

15. The system of claim 14, wherein:
    the certificate requests further include requests for pseudonym certificates;
    the API is further operable to transmit, on behalf of the certificate management service, via the communications network, to the plurality of clients, pseudonym certificates generated by a pseudonym certificate authority of the certificate management service;
    the plurality of clients include at least one distributor appliance that is operable to act as a proxy between the certificate management service and at least one computerized device needing certificates; and
    the at least one computerized device is operable to retrieve certificates from the distributor appliance.

16. The system of claim 15, wherein an enrollment certificate is a public key certificate identifying a holder of the public key certificate as an authorized participant in an ecosystem including a plurality of computerized devices, and wherein each authorized participant in the ecosystem is able to receive one or more pseudonym certificates that enable communications with the plurality of computerized devices.

17. A computer implemented method for providing quality of service (QoS) levels to clients requesting certificates from a certificate management service, the method comprising:
receiving, via an application programming interface (API), certificate requests from a plurality of clients, each certificate request including information indicating a number of computerized devices needing certificates, a timestamp indicating when the certificate request was transmitted, and a client identifier that specifies a client requesting the certificates;
distributing, by a QoS manager, the certificate requests from the plurality of clients across a plurality of client queues, each of the plurality of client queues corresponding to a particular client requesting certificates; and
dividing, by the QoS manager, a client's requests into subgroups of one or more entries, each of the one or more entries having a group size corresponding to a subset of the number of computerized devices needing certificates; and
transmitting retrieved entries from the plurality of client queues to the certificate management service.

18. The computer implemented method of claim 17, further comprising selecting, by a QoS arbiter, the retrieved entries from the plurality of client queues based at least in part on a latency level of the certificate management service, or the timestamps indicating when the certificate requests were transmitted.

19. The computer implemented method of claim 18, wherein selecting the retrieved entries from the plurality of client queues comprises using a round robin technique.

20. The computer implemented method of claim 18, wherein selecting the retrieved entries from the plurality of client queues is based on a dynamic priority assigned to each of the client queues, and wherein the respective, dynamic priority assigned to each of the client queues is assigned by the QoS arbiter based at least in part on a number of entries in each of the client queues.

21. The computer implemented method of claim 18, further comprising transmitting, using the QoS manager, the retrieved entries from the plurality of client queues to the certificate management service by obtaining the retrieved entries from the QoS queue in a sequence selected by the QoS arbiter.

22. The computer implemented method of claim 21, wherein each certificate request further includes additional information indicating a client priority level of a client submitting the request, and wherein the method further comprises selecting, using the QoS arbiter, the sequence of entries from the plurality of client queues to be placed in the QoS queue based at least in part on the client priority level indicated in each certificate request.

23. The computer implemented method of claim 22, wherein the client priority level for a client is based on a service tier associated with the client, and wherein the service tier corresponds to one of a plurality of tiers ranging from a lowest service level to a highest service level.

24. The computer implemented method of claim 22, further comprising dynamically re-ordering, using the QoS arbiter, the sequence of entries placed in the QoS queue based at least in part on respective client priority levels indicated in additional certificate requests received from additional clients.

25. The computer implemented method of claim 21, wherein each certificate request further includes additional information indicating a request urgency level associated with the request, and wherein the method further comprises selecting, using the QoS arbiter, the sequence of entries from the plurality of client queues to be placed in the QoS queue based at least in part on the request urgency level indicated in each certificate request.

26. The computer implemented method of claim 25, wherein a request urgency level for a certificate request is designated by a client submitting the certificate request, and wherein the request urgency level corresponds to one of a plurality of levels ranging from a lowest urgency option to a highest urgency option.

27. The computer implemented method of claim 17, wherein the computerized devices needing certificates correspond to one or more of an On Board Unit (OBU), an Electronic Control Unit (ECU), and a Road-Side Unit (RSU).

28. The computer implemented method of claim 17, wherein the plurality of clients include at least one distributor appliance or server that is operable to act as a proxy between the certificate management service and at least one computerized device needing certificates.

29. The computer implemented method of claim 17, wherein the certificate requests from the plurality of clients include requests for enrollment certificates, and wherein the method further comprises:
transmitting, to the plurality of clients, enrollment certificates generated by an enrollment certificate authority of the certificate management service.

30. The computer implemented method of claim 29, further comprising transmitting, on behalf of the certificate management service, via a communications network, to the plurality of clients, pseudonym certificates generated by a pseudonym certificate authority of the certificate management service, wherein the certificate requests further include requests for the pseudonym certificates, wherein the plurality of clients include at least one distributor appliance that is operable to act as a proxy between the certificate management service and at least one computerized device needing certificates, and wherein the at least one computerized device is operable to retrieve the certificates from the at least one distributor appliance.

* * * * *